US012705012B2

(12) United States Patent
Zhou et al.

(10) Patent No.: US 12,705,012 B2

(45) Date of Patent: Aug. 11, 2026

(54) DISPLAY FRAME RATE CONTROL METHOD AND RELATED APPARATUS FOR MITIGATING FLICKERING AND FRAME LOSS

(71) Applicant: HONOR DEVICE CO., LTD., Shenzhen (CN)

(72) Inventors: Jian Zhou, Shenzhen (CN); Fuhou Liu, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/994,170

(22) PCT Filed: Nov. 17, 2023

(86) PCT No.: PCT/CN2023/132245

§ 371 (c)(1),
(2) Date: Jan. 14, 2025

(87) PCT Pub. No.: WO2024/152719

PCT Pub. Date: Jul. 25, 2024

(65) Prior Publication Data

US 2026/0029983 A1 Jan. 29, 2026

(30) Foreign Application Priority Data

Jan. 20, 2023 (CN) ......................... 202310104679.8

(51) Int. Cl.
*G06F 3/147* (2006.01)

(52) U.S. Cl.
CPC .................................... *G06F 3/147* (2013.01)

(58) Field of Classification Search
CPC ..................................................... G06F 3/1454
See application file for complete search history.

(56) References Cited

U.S. PATENT DOCUMENTS 10,019,968 B2 * 7/2018 Bi ......................... G09G 5/393
2017/0193971 A1 7/2017 Bi et al.
(Continued)

FOREIGN PATENT DOCUMENTS

CN 112331145 A 2/2021
CN 113630572 A 11/2021
(Continued)

*Primary Examiner* — Chun-Nan Lin

(74) *Attorney, Agent, or Firm* — Fish & Richardson P.C.

(57) ABSTRACT

This application provides a frame rate control method and a related apparatus. According to the method, when a first application is run on an electronic device, screen display content is refreshed at a first frame rate. When switching from the first application to a second application is performed, frame rate switching is triggered. The frame rate switching is performed in two steps: (1) First, adjust a frequency of a TE signal. (2) Second, adjust a periodicity of a MIPI signal when the counted quantity of image frames received by the HWC reaches the first quantity (where the first quantity may be predetermined and written into storage space of the electronic device) after the frame rate switching instruction is buffered, to cause an adjusted frequency of the TE signal and an adjusted periodicity of the MIPI signal to take effect in a same screen refresh periodicity.

9 Claims, 17 Drawing Sheets

(56) References Cited

U.S. PATENT DOCUMENTS

| | | | | |
|---|---|---|---|---|
| 2022/0270533 | A1 | 8/2022 | Ranjan et al. | |
| 2022/0351679 | A1* | 11/2022 | Yang | G09G 3/3225 |
| 2023/0282162 | A1* | 9/2023 | Gao | G09G 3/3225 345/214 |
| 2023/0297190 | A1* | 9/2023 | Gao | G09G 3/3208 |
| 2024/0013704 | A1* | 1/2024 | Kim | G09G 3/2096 |
| 2024/0096280 | A1* | 3/2024 | Choi | G09G 3/3233 |
| 2024/0185775 | A1 | 6/2024 | Zhang et al. | |
| 2024/0211198 | A1 | 6/2024 | Zheng et al. | |
| 2024/0296813 | A1 | 9/2024 | Tian | |
| 2025/0306714 | A1* | 10/2025 | Niu | G06F 3/0412 |

FOREIGN PATENT DOCUMENTS

| | | | |
|---|---|---|---|
| CN | 113741848 | A | 12/2021 |
| CN | 114153415 | A | 3/2022 |
| CN | 114648951 | A | 6/2022 |
| CN | 115100993 | A | 9/2022 |
| CN | 116092452 | A | 5/2023 |
| CN | 116700653 | A | 9/2023 |
| WO | 2022105484 | A1 | 5/2022 |

* cited by examiner

DISPLAY FRAME RATE CONTROL METHOD AND RELATED APPARATUS FOR MITIGATING FLICKERING AND FRAME LOSS

CROSS-REFERENCE TO RELATED APPLICATIONS

This application is a National Stage of International Application No. PCT/CN2023/132245, filed on Nov. 17, 2023, which claims priority to Chinese Patent Application No. 202310104679.8, filed on Jan. 20, 2023, both of which are hereby incorporated by reference in their entireties.

TECHNICAL FIELD

This application relates to the field of display technologies, and in particular, to a frame rate control method and a related apparatus.

BACKGROUND

With rapid development of display technologies, there are more display screens that support dynamic adjustment of a refresh rate. For example, during running of an application that requires a high frame rate, a refresh rate of a display screen is increased to improve smoothness of a picture. During running of an application that requires a low frame rate, the refresh rate of the display screen is lowered to reduce power consumed by an electronic device. However, existing refresh rate adjustment solutions have issues with display anomalies.

SUMMARY

In view of this, this application provides a frame rate control method and a related apparatus, to resolve at least some of the foregoing problems, and discloses the following technical solutions.

According to a first aspect, this application provides a frame rate control method, applied to an electronic device using an LTPS screen. The method includes: receiving a first operation of a user; starting a first application in response to the first operation; during running of the first application, transmitting an image frame based on a first MIPI signal, and sending the image frame for display based on a first TE signal, where a frequency of the first TE signal is the same as a first frame rate; receiving a second operation of the user; starting a second application in response to the second operation and generating a frame rate switching instruction; buffering the frame rate switching instruction; generating a second TE signal based on the first TE signal; generating a second MIPI signal based on the first MIPI signal when a quantity of image frames received by a hardware composer of the electronic device reaches a first quantity since the frame rate switching instruction has been buffered; and transmitting the image frame based on the second MIPI signal, and sending the image frame for display based on the second TE signal, where a frequency of the second TE signal is the same as a second frame rate, and the second frame rate is different from the first frame rate. It can be learned that in this solution, after the frame rate switching instruction is generated, the frame rate switching instruction is first buffered, and then the frame rate switching instruction is executed in two steps: ① First, adjust a frequency of a TE signal. ② Second, adjust a periodicity of a MIPI signal when the counted quantity of image frames received by the HWC reaches the first quantity (where the first quantity may be predetermined and written into storage space of the electronic device) after the frame rate switching instruction is buffered, to cause an adjusted frequency of the TE signal and an adjusted periodicity of the MIPI signal to take effect in a same screen refresh periodicity. In this way, the solution avoids display anomalies caused by the TE frequency and the MIPI signal not taking effect synchronously during frame rate switching, thereby improving users' viewing experience during the frame rate switching.

In a possible implementation of the first aspect, before the generating a second MIPI signal based on the first MIPI signal when a quantity of image frames received by a hardware composer of the electronic device reaches a first quantity since the frame rate switching instruction has been buffered, the method further includes: after the frame rate switching instruction is buffered, counting the quantity of image frames received by the hardware composer of the electronic device; and when a count value reaches the first quantity, determining that the quantity of image frames received by the hardware composer of the electronic device reaches the first quantity since the frame rate switching instruction has been buffered. It can be learned that in this solution, when the frame rate switching instruction is buffered, the image frames received by the HWC are counted, to count a quantity of buffer periodicities (or referred to as a quantity of buffer frames) of the frame rate switching instruction. In this way, the solution can be easily implemented.

In a possible implementation of the first aspect, before the receiving a second operation of the user, the method further includes: receiving a third operation of the user; and closing the first application or returning to a home screen in response to the third operation.

In a possible implementation of the first aspect, the first application is a video application, and the second application is an application for displaying an image and text. For example, the second application may be a browser, Zhihu APP, WeChat® APP, or another application.

In a possible implementation of the first aspect, before the buffering the frame rate switching instruction, the method further includes: determining that the first frame rate is higher than the second frame rate. It can be learned that upon detecting a switch from a high frame rate to a low frame rate, execution of the frame rate control method provided in this application is triggered. After the switch from a high frame rate to a low frame rate, a frequency of the MIPI signal is adaptively reduced, thereby reducing overall power consumption of the electronic device. In addition, based on this solution, the adjusted frequency of the TE signal and the adjusted periodicity of the MIPI signal take effect in the same screen refresh periodicity, so that the display anomalies caused by the TE frequency and the MIPI signal not taking effect synchronously during the frame rate switching are avoided, and users' experience is improved.

In a possible implementation of the first aspect, the generating a second MIPI signal based on the first MIPI signal when a quantity of image frames received by a hardware composer of the electronic device reaches a first quantity since the frame rate switching instruction has been buffered includes: when the quantity of image frames received by the hardware composer reaches the first quantity since the frame rate switching instruction has been buffered, parsing the frame rate switching instruction to obtain the second frame rate; obtaining, based on a mapping relationship between a frame rate and a periodicity of a MIPI signal, a first periodicity matching the second frame rate; and generating the second MIPI signal based on the first periodicity by using the first MIPI signal, where a periodicity of the second MIPI signal is equal to the first periodicity, and the first periodicity is longer than a periodicity of the first MIPI signal.

In a possible implementation of the first aspect, the generating a second TE signal based on the first TE signal includes: parsing the frame rate switching instruction to obtain the second frame rate; and generating a TE frequency adjustment instruction based on the second frame rate, and generating the second TE signal based on the first TE signal in response to the TE frequency adjustment instruction.

According to a second aspect, this application further provides a frame rate control method, applied to an electronic device using an LTPS screen. The method includes: receiving a first operation of a user; starting a first application in response to the first operation; during running of the first application, transmitting an image frame based on a first MIPI signal, and sending the image frame for display based on a first TE signal, to enable the electronic device to refresh screen display content at a first frame rate, where a frequency of the first TE signal is the same as the first frame rate; receiving a second operation of the user; starting a second application in response to the second operation; generating a second TE signal based on the first TE signal in a first periodicity (for example, as shown in FIG. 8, triggering adjustment of a frequency of a TE signal in a frame B); generating a second MIPI signal based on the first MIPI signal in a second periodicity (for example, as shown in FIG. 8, triggering adjustment of a periodicity of a MIPI signal in a frame D), where the second periodicity follows the first periodicity, with a preset quantity of first periodicity intervals in between, and a value of the first periodicity interval is a reciprocal of the first frame rate; and in a third periodicity, transmitting the image frame based on the second MIPI signal, and sending the image frame for display based on the second TE signal (for example, as shown in FIG. 8, an adjusted periodicity of the MIPI signal and an adjusted frequency of the TE signal taking effect synchronously in a frame E), where the third periodicity follows the second periodicity, a frequency of the second TE signal is the same as a second frame rate, and the second frame rate is different from the first frame rate. It can be learned that in this solution, the adjustment of the frequency of the TE signal is first triggered, and then the adjustment of the periodicity of the MIPI signal is triggered a first quantity of screen refresh periodicities (that is, after a first quantity of image frames is received) after the adjustment of the TE frequency is triggered, to ensure that the TE frequency and MIPI signal take effect in a same screen refresh periodicity. In this way, display anomalies caused by the TE frequency and the MIPI signal not taking effect synchronously during frame rate switching are avoided, and users' viewing experience during the frame rate switching is improved.

According to a third aspect, this application further provides a frame rate control method, applied to an electronic device using an LTPO screen. The method includes: receiving a first operation of a user; starting a first application in response to the first operation; displaying an image frame at a first frame rate during running of the first application, where the first frame rate is 90 Hz; receiving a second operation of the user; starting a second application in response to the second operation, and generating an original frame rate switching instruction, where the original frame rate switching instruction is used for causing the electronic device to display the image frame at a second frame rate, and the second frame rate is lower than the first frame rate; generating a first frame rate switching instruction, and adjusting the first frame rate to a third frame rate in response to the first frame rate switching instruction, where the third frame rate is 120 Hz; generating a second frame rate switching instruction in a next screen refresh periodicity after the original frame rate switching instruction is generated; adjusting the third frame rate to the second frame rate in response to the second frame rate switching instruction. It can be learned that in this solution, during a switch from 90 Hz to another lower frame rate (which may be referred to as a target frame rate), the switch from 90 Hz to the target frame rate is not performed directly, but is performed in two steps. ① Switch the frame rate from 90 Hz to 120 Hz. ② Switch the frame rate from 120 Hz to the target frame rate. The frame rate is first switched to 120 Hz to cause a frame rate of a next frame to remain at 90 Hz, and after one frame, the frame rate is switched to the target frame rate, so as to avoid a frame loss caused by directly switching the frame rate from 90 Hz to 60 Hz, thereby improving users' viewing experience during a switch from 90 Hz to another lower frame rate of the LTPO screen.

In a possible implementation of the third aspect, the generating a second frame rate switching instruction in a next screen refresh periodicity after the original frame rate switching instruction is generated includes buffering the original frame rate switching instruction after the original frame rate switching instruction is generated; and generating the second frame rate switching instruction when a quantity of image frames received by a hardware composer of the electronic device reaches 1 since the original frame rate switching instruction has been buffered.

In a possible implementation of the third aspect, before the receiving a second operation of the user, the method further includes: receiving a third operation of the user; and closing the first application or returning to a home screen in response to the third operation.

In a possible implementation of the third aspect, the first application is a video application, and the second application is an application for displaying an image and text.

According to a fourth aspect, this application further provides a frame rate control method, applied to an electronic device. The method includes: receiving a first operation of a user; starting a first application in response the first operation; during running of the first application, transmitting an image frame based on a first MIPI signal, and sending the image frame for display based on a first TE signal, where a frequency of the first TE signal is the same as a first frame rate, receiving a second operation of the user; starting a second application in response to the second operation and generating a frame rate switching instruction; if it is determined that a screen type of the electronic device is an LTPS screen, buffering the frame rate switching instruction; generating a second TE signal based on the first TE signal; generating a second MIPI signal based on the first MIPI signal when a quantity of image frames received by a hardware composer of the electronic device reaches a first quantity since the frame rate switching instruction has been buffered; and transmitting the image frame based on the second MIPI signal, and sending the image frame for display based on the second TE signal, where a frequency of the second TE signal is the same as a second frame rate, and the second frame rate is different from the first frame rate; if it is determined that a screen type is an LTPO screen and it is determined that the first frame rate is 90 Hz and the second frame rate is less than the first frame rate, generating a first frame rate switching instruction; adjusting the first frame rate to a third frame rate in response to the first frame rate switching instruction, where the third frame rate is 120 Hz; generating a second frame rate switching instruction in a next screen refresh periodicity after the frame rate switching instruction is generated; and adjusting the third frame rate to the second frame rate in response to the second frame rate switching instruction. It can be learned that in this solution, there is no need to develop different frame rate switching processing logic for different screen types. Same frame rate switching processing logic may be used for electronic devices using the LTPS screen and the LTPO screen, thereby expanding the application range of a frame rate switching control program and reducing development workload of a developer.

According to a fifth aspect, this application further provides an electronic device. The electronic device includes, one or more processors, a memory, and a touch screen. The memory is configured to store program code. The processor is configured to run the program code to enable the electronic device to implement the frame rate control method according to any one of the possible implementations of the first aspect to the fourth aspect.

According to a sixth aspect, this application further provides a computer-readable storage medium storing instructions. When the instructions are executed on an electronic device, the electronic device is enabled to perform the frame rate control method according to any one of the possible implementations of the first aspect to the fourth aspect.

According to a seventh aspect, this application further provides a computer program product storing executable instructions. When the computer program product runs on an electronic device, the electronic device is enabled to implement the frame rate control method according to any one of the possible implementations of the first aspect to the fourth aspect.

It should be understood that descriptions of technical features, technical solutions, beneficial effects or similar expressions in this application do not imply that all features and advantages can be achieved in any single embodiment. Instead, it may be understood that descriptions of features or beneficial effects indicate that at least one embodiment includes specific technical features, technical solutions, or beneficial effects. Therefore, descriptions of the technical features, technical solutions, or beneficial effects in this specification do not necessarily refer to a same embodiment. Further, the technical features, technical solutions, and beneficial effects described in this embodiment may be combined in any suitable manner. A person skilled in the art understands that embodiments can be implemented without one or more particular technical features, technical solutions, or beneficial effects of a particular embodiment. In other embodiments, additional technical features and beneficial effects may be further identified in a particular embodiment that does not embody all embodiments.

BRIEF DESCRIPTION OF DRAWINGS

To describe the technical solutions in embodiments of the present invention or in conventional technologies more clearly, the following briefly describes the accompanying drawings required for describing embodiments or conventional technologies. Apparently, the accompanying drawings in the following description show some embodiments of the present invention, and a person of ordinary skill in the art may still derive other drawings from these accompanying drawings without creative efforts.

DESCRIPTION OF EMBODIMENTS

In the specification, claims, and accompanying drawings of this application, the terms "first", "second", "third", and the like are intended to distinguish between different objects but do not indicate a particular order.

In embodiments of this application, the term such as "example" or "for example" is used to represent giving an example, an illustration, or a description. Any embodiment or design scheme described as an "example" or "for example" in embodiments of this application should not be explained as being more preferred or having more advantages than another embodiment or design scheme. To be precise, use of the term, such as "example" or "for example", is intended to present a related concept in a specific manner.

To describe the following embodiments clearly and concisely, brief descriptions for related technologies are as follows.

A frame rate is a frequency at which consecutive images (frames) appear on a display screen, and indicates a quantity of pictures transmitted per unit of time (1 second).

A refresh rate indicates a quantity of times an electron beam repeatedly scans an image on a screen. A higher refresh rate indicates higher stability of a displayed image.

A display driver integrated circuit (Display Driver Integrated Circuit, DDIC) is a chip configured to drive a display screen to display an image, and has functions such as controlling a display panel to perform self-illumination and image display. During image display, after receiving image data from an application processor (Application Processor, AP) via a mobile industry processor interface (Mobile Industry Processor Interface, MIPI), the DDIC drives the display panel to perform image scanning based on the image data, so as to implement image display. A software architecture of an electronic device shown in FIG. 6 below runs in the AP. To be specific, an application layer, an application framework layer, a system library layer, a hardware abstraction layer, and a kernel layer all run in the application processor.

A tearing effect (Tearing Effect, TE) signal is a signal generated by a DDIC to prevent a tearing problem when an image is refreshed during image display. When the DDIC controls and finishes refresh of one image frame and is ready to refresh a next image frame, the DDIC generates the TE signal.

The electronic device may dynamically adjust the frame rate based on different service scenarios. Further, the DDIC dynamically adjusts the refresh rate of the display screen based on the frame rate.

Figure 1:
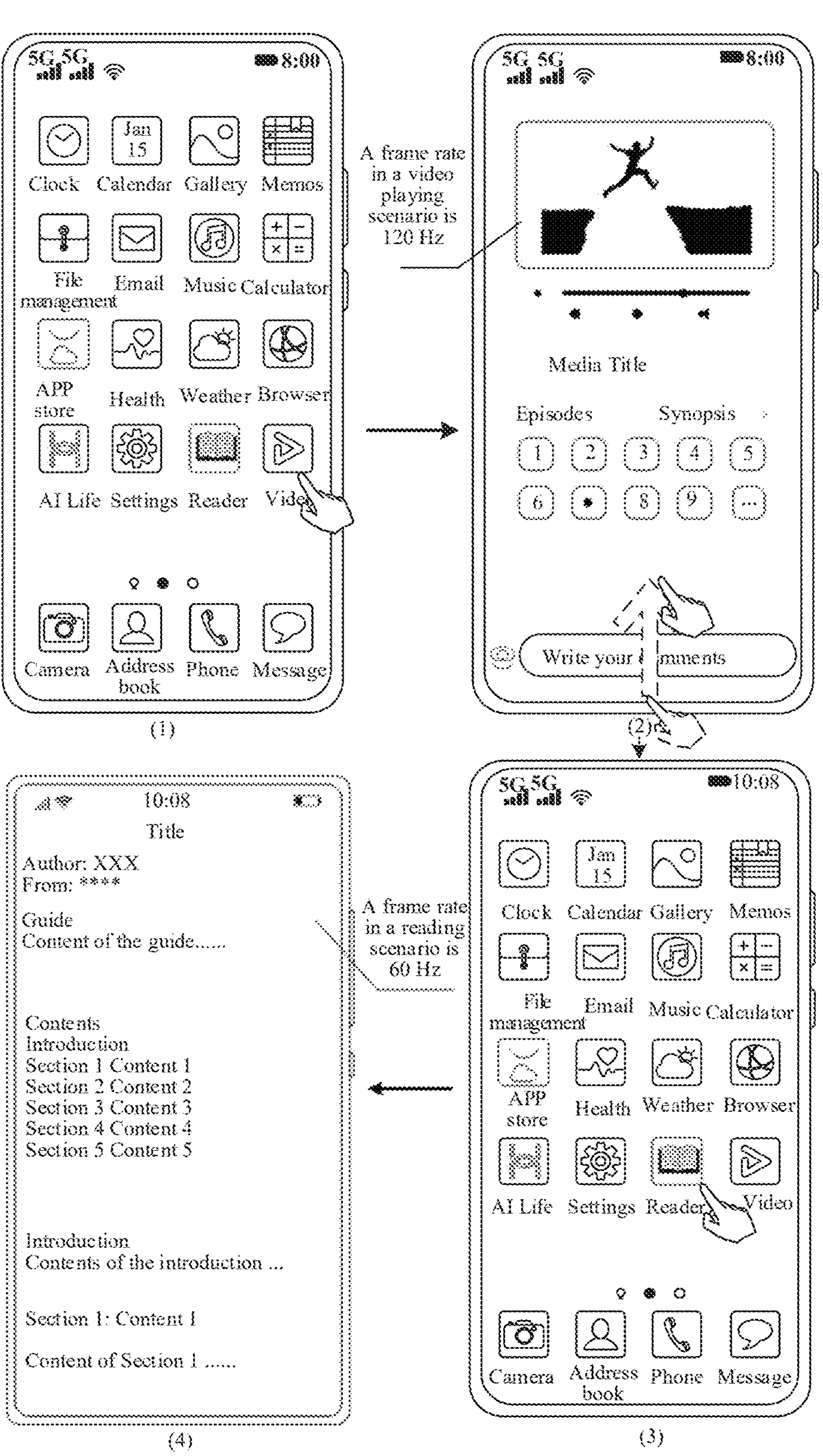
FIG. 1 is a schematic diagram of service scenario switching according to an embodiment of this application.

For example, as shown in section (1) of FIG. 1, upon receipt of a user's tap operation on a video application, a mobile phone jumps to a page of the video application as shown in section (2) of FIG. 1, that is, starts the video application. Upon receipt of a user's operation of sliding upward from the bottom of a page as shown in section (2) of FIG. 1, the mobile phone exits the video application or directly returns to a home screen as shown in section (3) of FIG. 1. Upon receipt of a user's tap operation on a reader application, the mobile phone jumps to a page of the reader application shown in section (4) of FIG. 1, that is, starts the reader application.

After the video application is started, the video application requires a high frame rate, such as 120 Hz or 90 Hz, when playing a video. The user exits the video playing application and starts the reader application. The reader application requires a low frame rate, such as 60 Hz, 40 Hz, or 30 Hz. After a switch from a video scenario to a reading scenario, the frame rate of the electronic device can be switched from 120 Hz to 60 Hz, to reduce power consumption of the electronic device.

However, a screen flickering or frame loss phenomenon exists in the existing frame rate switching solution. Currently, there are two types of display screens, that is, a low-temperature poly-silicon (Low-Temperature Poly-silicon, LTPS) screen and a low-temperature polycrystalline oxide (Low-Temperature Polycrystalline Oxide, LTPO) screen. For different frame rates, the LTPS screen usually uses different hardware clocks (that is, a clock for image data transmission via the MIPI, which can also be denoted as a MIPI CLK) for image data transmission. A low frame rate indicates a low/high hardware clock rate, and a high frame rate indicates a high hardware clock. An implementation principle of the LTPO screen is different from that of the LTPS screen. For different frame rates, the LTPO screen needs to use a same hardware clock for image data transmission. For both types of screens, there are problems during frame rate switching. The problems of the LTPS screen and the LTPO screen are described below respectively.

1. Screen Flickering Occurs in the Current LTPS Screen During Frame Rate Switching.

For the LTPS screen, the hardware clock and a TE frequency (that is, a frequency of a TE signal) are usually changed during frame rate switching. Usually, the hardware clock and the TE frequency are changed in a same frame. However, a change to the hardware clock takes effect immediately in a next image transmission periodicity, while a change to the TE frequency may not take effect immediately. For some DDICs, the TE frequency takes effect in a next frame, and for some DDICs, the TE frequency takes effect after one or two frames. The one or two frames cause a mismatch of the hardware clock and the TE frequency, resulting in an anomaly of screen flickering.

An APP is used to render a layer at an AP side, and SurfaceFlinger is used to composite layers obtained through drawing to obtain image data. Finally, the image data is sent for display through the MIPI interface. In other words, the image data is written into the DDIC, and the DDIC controls a display panel to refresh and display an image. After completing image data preparation, the AP does not send the image data for display immediately, but sends the image data for display when detecting the TE signal output by the DDIC. In other words, the AP starts transmission of a next frame of image data only after detecting a rising edge of the TE signal.

Figure 2:
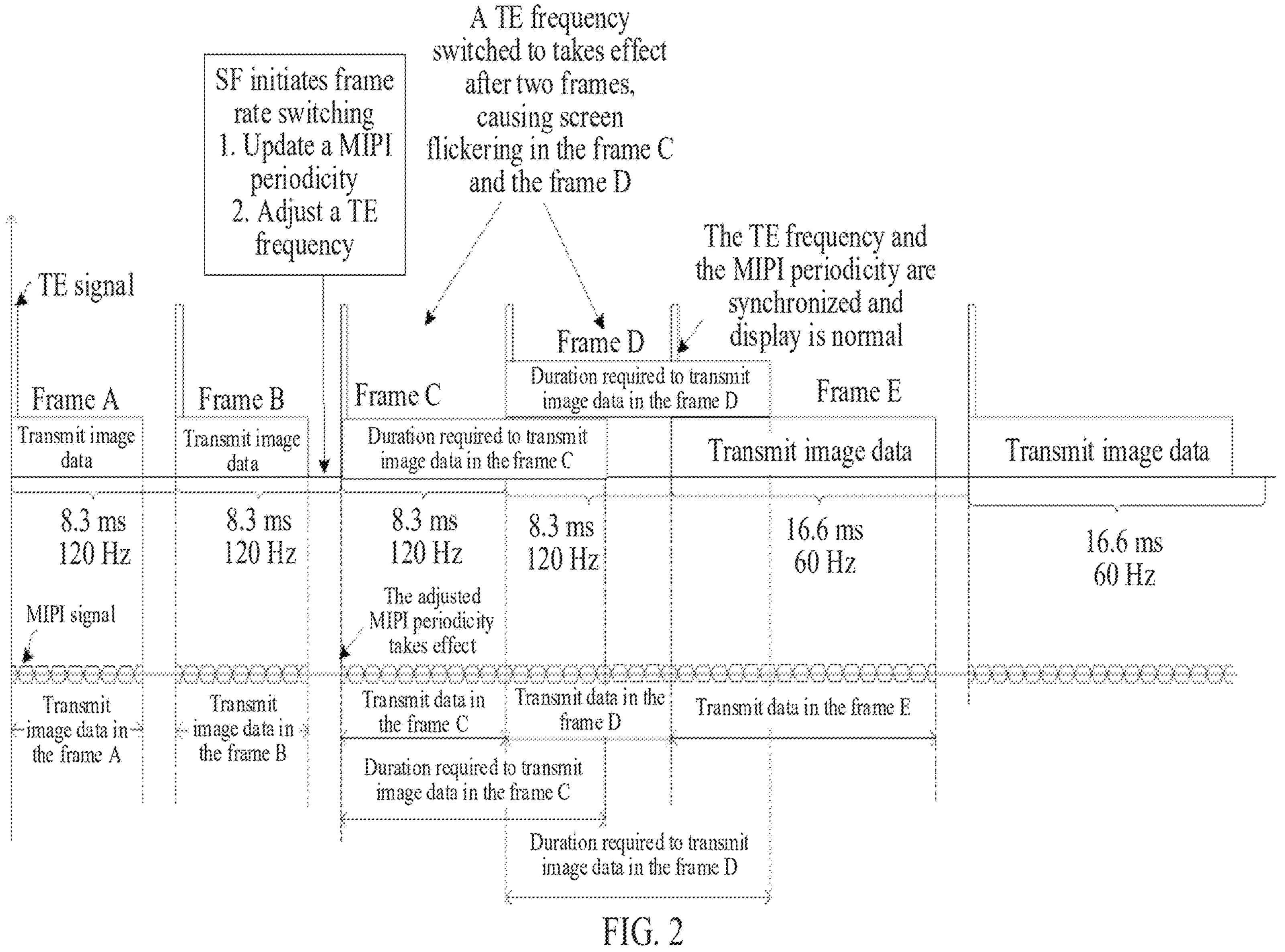
FIG. 2 is a schematic diagram of frame rate switching of a conventional LTPS screen according to an embodiment of this application.

As shown in FIG. 2, frame rates of a frame A and a frame B are both 120 Hz. During display of an image in the frame B, SurfaceFlinger initiates frame rate switching from 120 Hz to 60 Hz. When a next TE signal is detected, a modified MIPI CLK takes effect. To be specific, a modified MIPI CLK takes effect in a frame C immediately. In this example, an adjusted TE frequency takes effect two frames later compared to a moment the frame rate switching is initiated. In other words, a modified TE frequency takes effect in a frame E. In this case, the modified MIPI CLK takes effect in the frame C and a frame D, while the TE frequency does not take effect.

When the frame rate is switched from 120 Hz to 60 Hz and a MIPI CLK rate is lowered, a speed of image data transmission is reduced. In other words, longer time is required to transmit a same amount of image data by using the MIPI CLK having a lowered rate. However, because the modified TE frequency does not take effect, meaning the TE frequency for output is still 120 Hz, when transmission of image data in the frame C has not been completed, a TE signal in the frame D is output. As mentioned before, upon detecting the rising edge of the TE signal, the AP starts the transmission of the next frame of image data. In other words, transmission of image data in the frame D is started before transmission of the image data in the frame C is completed. As a result, display anomaly of the image in the frame C is caused, and screen flickering occurs. For the same reason, transmission of image data in the frame E is started before the transmission of the image data in the frame D is completed, resulting in display anomaly of the image in the frame D. After the modified TE frequency takes effect in the frame E, the MIPI CLK and the TE frequency are synchronized and the image is displayed normally. It can be learned that during a switch from a high frame rate to a low frame rate, screen flickering occurs in the LTPS screen.

Figure 3:
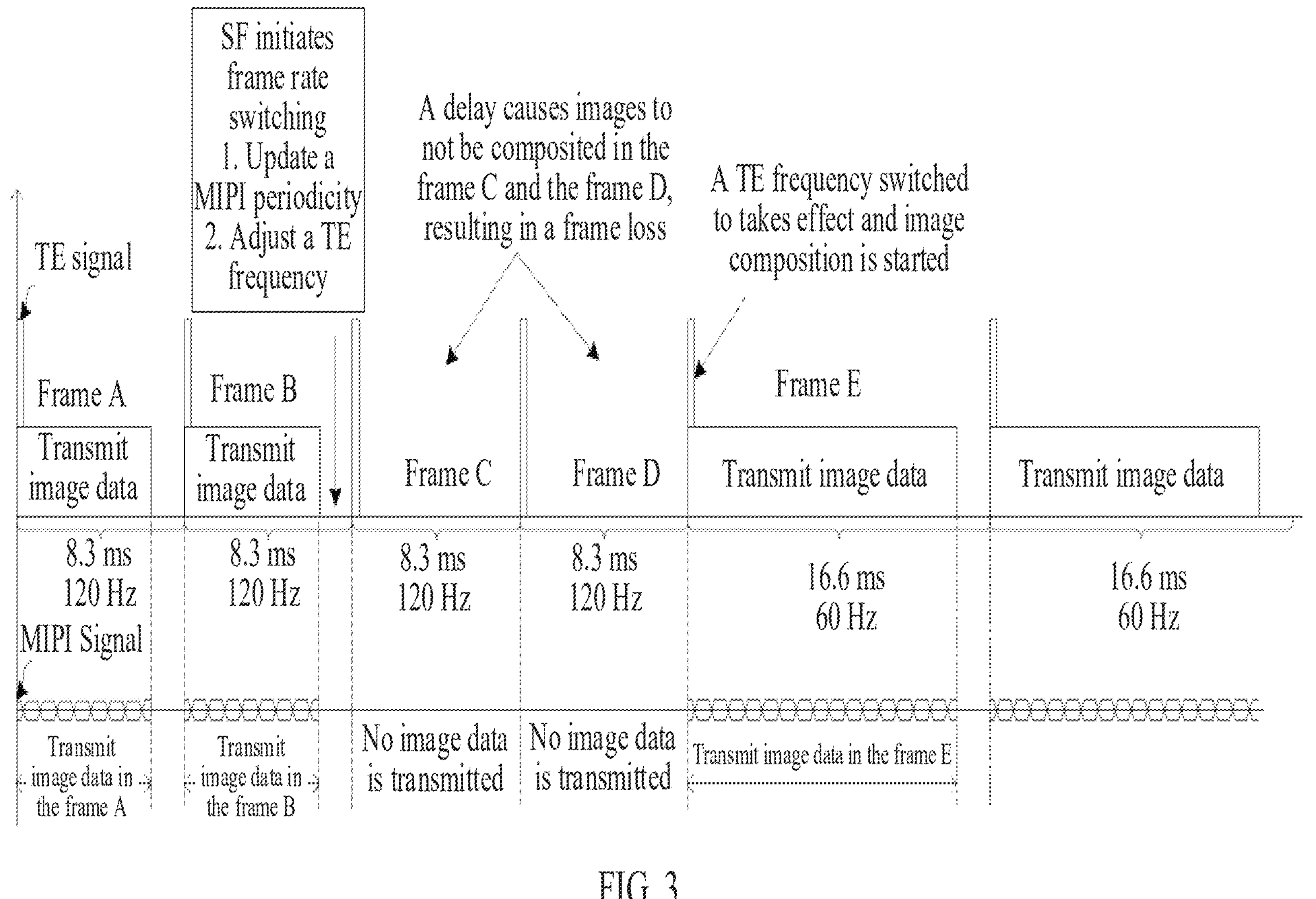
FIG. 3 is a schematic diagram of frame rate switching of another conventional LTPS screen according to an embodiment of this application.

To address the display anomaly occurs when the LTPS screen switches from a high frame rate to a low frame rate as shown in FIG. 2, a delay is usually introduced after a frame rate switching instruction is sent to the DDIC, and during the delay, no image composition is performed. Composition of a next image frame is performed only after the modified TE periodicity of the DDIC takes effect. For example, as shown in FIG. 3, after a frame rate switching instruction is issued in a frame B, image composition is not performed in a frame C and a frame D, and composition of a next image frame is performed in a frame E. In this case, a frame loss occurs in the frame C and the frame D.

2. A Frame Loss Occurs in the Current LTPO Screen During Frame Rate Switching.

The LTPO screen uses 120 Hz as a base frequency, and other frame rates are achieved through a frameskip (Frameskip) mechanism based on the base frequency. The resulting frequencies are all divisible by 120 Hz, such as 60 Hz, 40 Hz, 30 Hz, 20 Hz, and 10 Hz. However, 90 Hz is also used in actual applications, and 90 Hz is simulated based on LongV. To be specific, duration of a high-level part of a TE signal is lengthened to 2.8 ms based on 120 Hz (8.3 ms), that is, 2.8 ms+8.3 ms=11.1 ms. In this case, a frame loss occurs because image composition by SF is affected due to inaccuracy of a TE periodicity of a first frame caused by a switch from 90 Hz to another frame rate.

Figure 4:
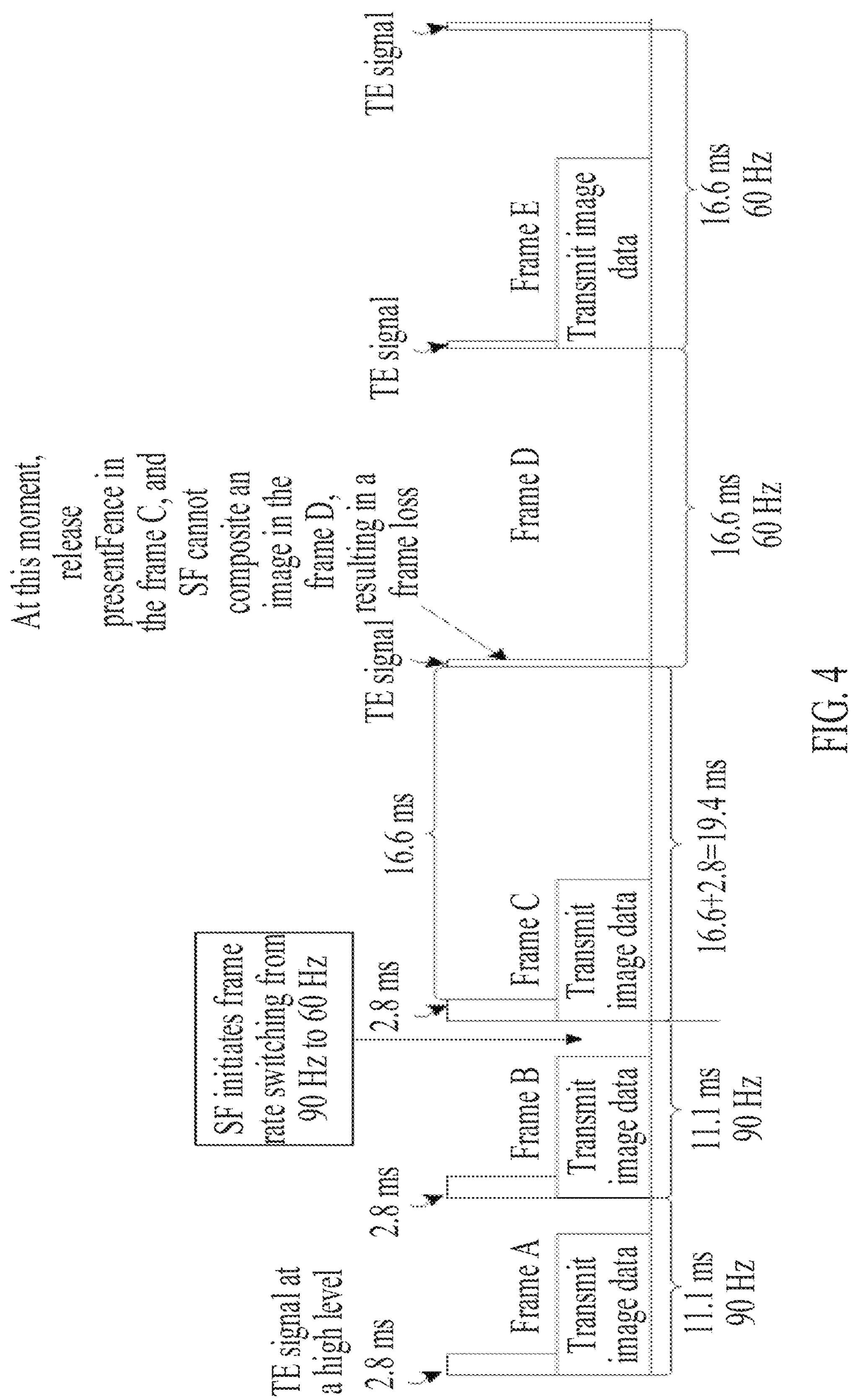
FIG. 4 is a schematic diagram of frame rate switching of a conventional LTPO screen according to an embodiment of this application.

For example, as shown in FIG. 4, the frame rate remains at 90 Hz in a frame A and a frame B, and the frame rate is switched from 90 Hz to 60 Hz in the frame B. However, in a next periodicity (that is, a frame C), modification on the TE signal cannot be performed and take effect in a timely manner, duration of the high-level part of the TE signal remains at 2.8 ms, and duration of a low-level part of the TE signal is changed to a periodicity corresponding to 60 Hz, that is. 16.6 ms. To be specific, a periodicity in a frame C is: 16.6 ms+2.8 ms=19.4 ms. The periodicity of this frame is inaccurate and is 2.8 ms longer than a periodicity of 16.6 ms corresponding to 60 Hz.

Transmission of image data from the AP to the DDIC starts from a rising edge of the TE signal. In other words, 2.8 ms of the high-level part is counted into an image sending periodicity, and the periodicity in the frame C is lengthened by 2.8 ms, causing presentFence (indicating that display of a previous frame is completed) to be released 2.8 ms later. SF uses a VSYNC signal periodicity as a periodicity for image compositing. If it is detected that presentFrence is not released after the VSYNC signal is received, SF does not composite a next image frame.

After a frame rate switching instruction for switching from 90 Hz to 60 Hz is issued to an HWC, an abnormal periodicity of 19.4 ms of the TE signal of the DDIC is synchronized to VSYNC, leading to disorder in VSYNC modeling of SF. As a result, a VSYNC signal and the TE signal of SF are not aligned based on an offset (that is, an agreed offset between the VSYNC signal and the TE signal), resulting in a mismatch between working rhythm of SF (where SF works based on a VSYNC signal periodicity) and working rhythm of a display driver (where the display driver works based on a TE signal periodicity). Consequently, a deviation occurs between a moment when presentFence is released and a moment when a rising edge of the VSYNC signal of SF arrives, leading to composition failure of SF due to timeout of presentFence release. As shown in FIG. 4, the untimely release of a presentFence signal in the frame C causes SF to be unable to composite an image in the frame D, resulting in a frame loss in the D frame.

After discovering the foregoing issues with the current frame rate control scheme, the inventor proposes the frame rate control method in this application. The method is applied to an electronic device shown in FIG. 5.

The electronic device may be an electronic device provided with a display screen, such as a mobile phone, a tablet computer, a desktop/laptop notebook computer, an ultra-mobile personal computer (Ultra-mobile Personal Computer, UMPC), a handheld computer, a netbook, a personal digital assistant (Personal Digital Assistant, PDA), or a wearable electronic device. A specific form of the electronic device is not specially limited in this application.

Figure 5:
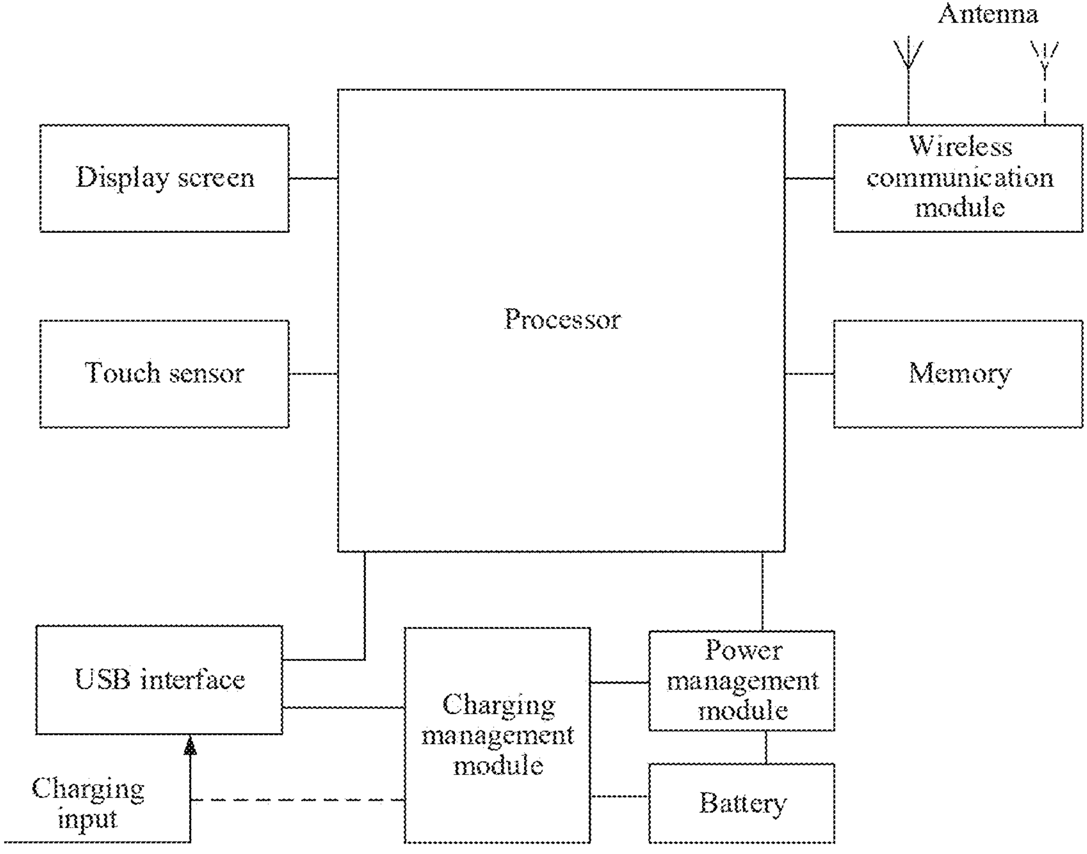
FIG. 5 is a schematic diagram of a structure of an electronic device according to an embodiment of this application.

As shown in FIG. 5, the electronic device may include a processor, a display screen, a touch sensor, a memory, a communication module, a USB interface, a charging management module, a power management module, a battery, or the like.

It may be understood that the schematic structure in this embodiment constitutes no specific limitation on the electronic device. In other embodiments, the electronic device may include more or fewer components than those shown in the figure, some components may be combined, some components may be split, or a different component deployment may be used. The illustrated components may be implemented by hardware, software, or a combination of software and hardware.

The processor is a nerve center and a command center of the electronic device. The controller may generate an operation control signal based on instruction operation code and a timing signal, to complete control of fetching and executing instructions.

The processor may include one or more processing units. For example, the processor may include an application processor, a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be separate components, or may be integrated into one or more processors.

The memory may be configured to store computer-executable program code. The computer-executable program code may include an operating system, an application required by at least one function (such as an audio playing function, or an image or video playing function), and the like. The executable program code includes instructions, and the processor runs the instructions stored in the memory, to enable the electronic device to perform various functional applications and data processing. For example, in this application, the processor runs the instructions stored in the memory to enable the electronic device to perform the frame rate control method provided in this application.

The display screen is configured to display an image, a video, a series of graphical user interfaces (graphical user interfaces, GUIs), and the like. The electronic device may include one or N display screens. N is a positive integer greater than 1.

The display screen includes a display panel. The display panel may use a liquid crystal display (liquid crystal display, LCD), an organic light-emitting diode (organic light-emitting diode. OLED), an active-matrix organic light emitting diode or an active-matrix organic light emitting diode (active-matrix organic light emitting diode, AMOLED), a flex light-emitting diode (flex light-emitting diode, FLED), a mini-LED, micro-LED, micro-OLED, a quantum dot light emitting diode (quantum dot light emitting diodes, QLED), or the like.

The touch sensor is also referred to as a “touch device”. The touch sensor may be disposed on the display screen. The touch sensor and the display screen form a touchscreen, also referred to as a “touch control screen”. The touch sensor is configured to detect a touch operation performed on or near the touch sensor. The touch sensor may transfer the detected touch operation to the application processor to determine a type of a touch event. Visual output related to the touch operation may be provided by using the display screen. In some other embodiments, the touch sensor may be alternatively disposed on a surface of the electronic device, and may be located at a position different from that of the display screen.

The communication module may include at least one of a mobile communication module and a wireless communication module.

A wireless communication function of the electronic device may be implemented by using an antenna, the mobile communication module, the wireless communication module, the modem processor, the baseband processor, or the like.

The mobile communication module may provide a solution applied to the electronic device for wireless communication such as 2G, 3G, 4G, or 5G.

The wireless communication module may provide a solution applied to the electronic device for wireless communication including a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like. The wireless communication module may be one or more devices integrating at least one communication processing module.

The USB interface is an interface that complies with a USB standard specification, and may be specifically a mini USB interface, a micro USB interface, a USB Type C interface, or the like. The USB interface may be configured to be connected to a charger to charge the electronic device, and may be also configured to transmit data between the electronic device and a peripheral device. The USB interface may also be configured to be connected to a headset to play an audio using the headset. This interface may also be configured to be connected to another electronic device, such as an AR device.

The charge management module is configured to receive charging input from the charger. The charger may be a wireless charger or a wired charger. In some wired charging embodiments, the charging management module may receive charging input from the wired charger via the USB interface. In some wireless charging embodiments, the charging management module may receive wireless charging input via a wireless charging coil of the electronic device. The charge management module may supply power to the electronic device by using the power management module when charging the battery.

The power management module is configured to be connected to the battery, the charge management module, and the processor. The power management module receives input from the battery and/or the charging management module to supply power to various devices/modules in the electronic device.

In addition, an operating system runs on the foregoing components, for example, an iOS® operating system, an Android® open-source operating system, or a Windows® operating system. An application may be installed and run in the operating system.

The operating system of the electronic device may use a layered architecture, an event-driven architecture, a microkernel architecture, a microservice architecture, or a cloud architecture. In this embodiment of this application, a software structure of the electronic device is described by using an Android system with a layered architecture as an example.

Figure 6:
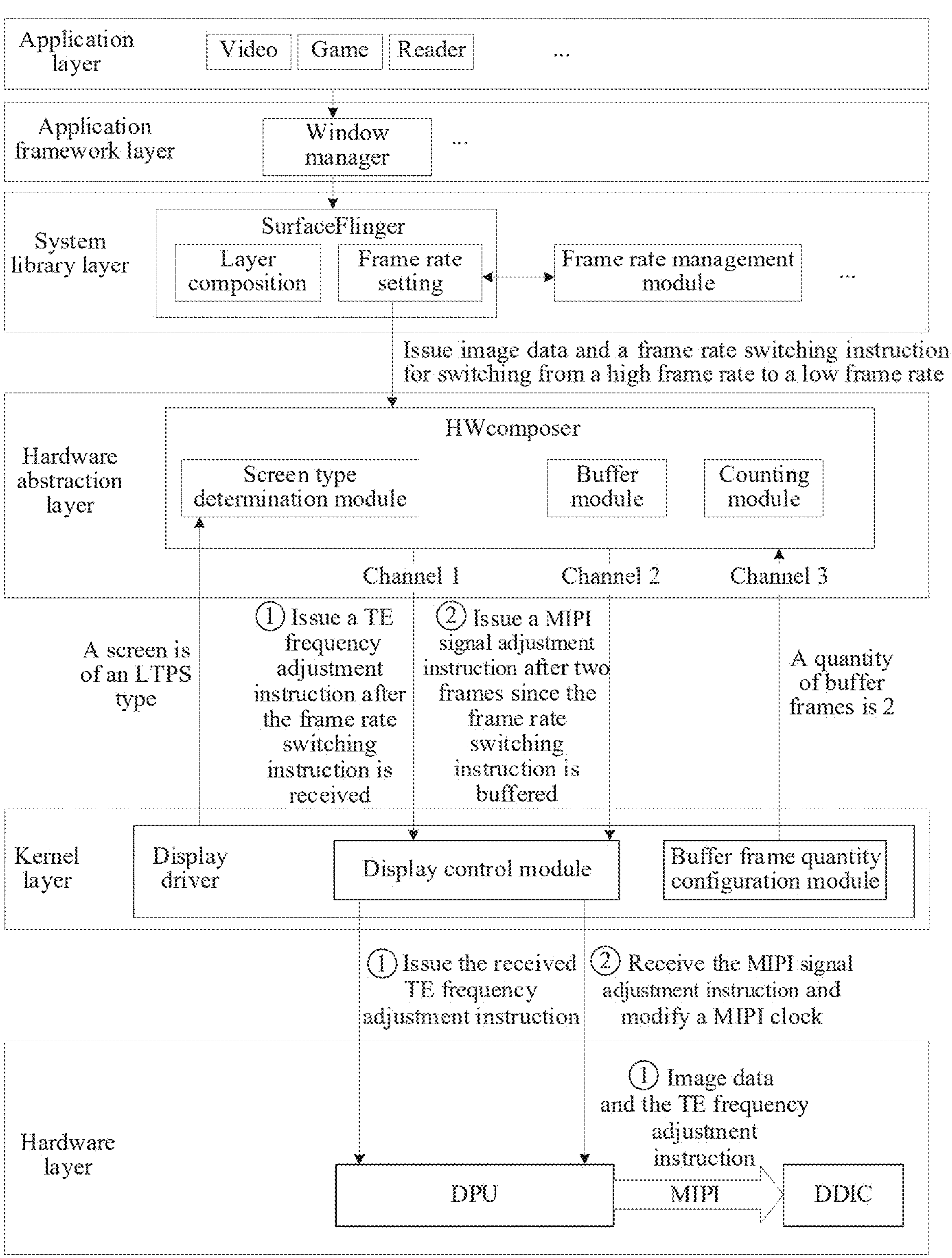
FIG. 6 is a schematic diagram of a software architecture of an electronic device using an LTPS screen according to an embodiment of this application.
Figure 7:
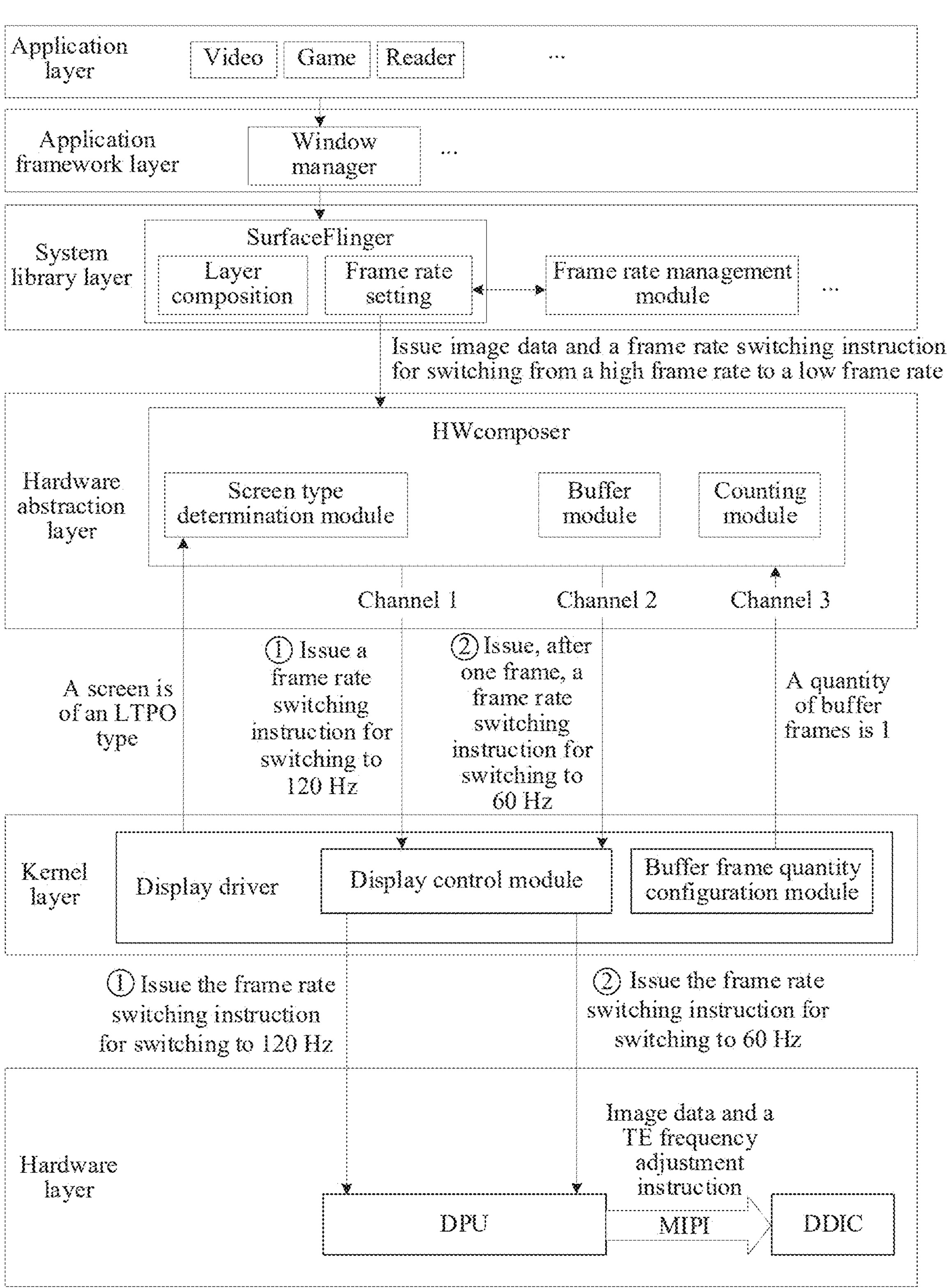
FIG. 7 is a schematic diagram of a software architecture of an electronic device using an LTPO screen according to an embodiment of this application.

FIG. 6 is a block diagram of a software structure of an electronic device using an LTPS screen according to an embodiment of this application. FIG. 7 is a block diagram of a software structure of an electronic device using an LTPO screen according to an embodiment of this application.

In the layered architecture, software is divided into a plurality of layers, and each layer has a clear role and task. The layers communicate with each other through software interfaces. In some embodiments, the Android system is divided into a plurality of layers from top to bottom: an application layer, an application framework (Framework) layer, an Android runtime (Android runtime) and system library, a hardware abstraction layer (hardware abstraction layer, HAL), and a kernel (Kernel) layer.

The application layer may include a series of application packages. As shown in FIG. 6 and FIG. 7, the application packages may include applications such as video, game, and reader.

The application framework layer provides an application programming interface (application programming interface, API) and a programming framework for the applications in the application layer. The application framework layer includes some predefined functions.

In embodiments of this application, as shown in FIG. 6 and FIG. 7, the application framework layer includes Window ManagerService (Window ManagerService, WMS). A window manager is configured to manage a window application.

The window manager may obtain a size of a display screen, determine whether there is a status bar, perform screen locking, perform screen capturing, and the like. The window manager is an interface that manages an Android window mechanism and displays a bottom layer of View.

For the Android runtime and system library (Native). Android runtime includes a kernel library and a virtual machine. The Android runtime is responsible for scheduling and managing the Android system.

The core library includes two parts: one part being functional functions that java needs to call, and the other part being an Android kernel library.

The application layer and the application framework layer are run in the virtual machine. The virtual machine executes Java files of the application layer and the application framework layer as binary files. The virtual machine is configured to perform functions, such as object life cycle management, stack management, thread management, security and exception management, and garbage collection.

The system library may include a plurality of function modules. For example, in embodiments of this application, the system library may include: a display compositor (SurfaceFlinger), a frame rate management module, and the like.

A function of SurfaceFlinger is to receive graphics display data from a plurality of sources, composite the graphics display data, and send composited graphics display data to a hardware display device, such as a DDIC.

The frame rate management module is configured to dynamically adjust a current running frame rate of an application based on a service scenario of the electronic device, and trigger SurfaceFlinger to initiate frame rate switching.

The hardware abstraction layer (HAL) acts as a bridge between software and hardware, encapsulates a hardware driver at the bottom layer, and provides, for the Framework layer, a general interface for calling the driver. For example, in embodiments of this application, the hardware abstraction layer may include a hardware composer (hardware composer, HWC). The hardware composer is configured to use hardware to implement a function of composition and display of image data.

In some embodiments of this application, in addition to a functional module for implementing composition and display of the image data by using the hardware, the HWC may further include a screen type determination module, a buffer module, and a counting module.

The screen type determination module is configured to determine whether a screen type of the electronic device is an LTPS screen or an LTPO screen; and if the screen type is an LTPS screen, continue to determine whether current frame rate switching is to switch from a high frame rate to a low frame rate. If the current frame rate switching is to switch from a high frame rate to a low frame rate, the frame rate control method of this application is performed. If a current screen is an LTPO screen and current frame rate switching is from 90 Hz to 60 Hz (or to another lower frame rate such as 40 Hz or 30 Hz), execution of the frame rate control method of this application is triggered.

In an embodiment, in an initialization stage of the operating system of the electronic device, the HWC may read, from a display driver through channel 3 (or referred to as a third channel) shown in FIG. 6, the screen type of the current electronic device and a quantity of frames, that is, a preset quantity of frames, delayed for a TE frequency corresponding to the screen to take effect.

The buffer module is configured to buffer a frame rate switching instruction sent by SurfaceFlinger to the HWC.

The counting module is configured to count image frames received by the HWC after the frame rate switching instruction is buffered.

The kernel layer is a layer between hardware and software. In embodiments of this application, the kernel layer at least includes the display driver and the like.

In embodiments of this application, a display control module and a buffer frame quantity configuration module are provided in the display driver.

The buffer frame quantity configuration module stores a quantity of frames (that is, the first quantity mentioned above) delayed for a TE frequency, corresponding to a DDIC currently used by the electronic device, to take effect. For example, the quantity of frames is 1 or 2. This parameter is written directly into code of the display driver.

In embodiments of this application, a channel between the HWC and the display driver may be a communication interface, and a newly added communication channel between the HWC and the display driver may provide a new interface for the HWC and the display driver.

The display control module is configured to respond to an instruction issued by the HWC.

In embodiments of this application, the hardware layer may include a data processing unit (Data Processing Unit, DPU), a DDIC, and a display panel (such as an OLED or an LCD).

As shown in FIG. 6, an APP currently running on the electronic device performs layer drawing and rendering, and the window manager is used to implement management of underlying View of the APP currently running on the electronic device. Layer data is then transmitted to SurfaceFlinger for layer composition to obtain image data.

When the APP currently running on the electronic device changes, for example, the APP is switched from a video application to a reader application, the frame rate management module may aware that a service scenario of the electronic device changes. To be specific, the scenario is changed from a high frame rate scenario to a low frame rate scenario. SurfaceFlinger is triggered to initiate frame rate switching, for example, from 120 Hz to 60 Hz. SurfaceFlinger issues the frame rate switching instruction when sending the image data to the HWC. The frame rate switching instruction carries a target frame rate, for example, 60 Hz.

In this embodiment, upon receipt of the frame rate switching instruction, the HWC first determines the screen type of the electronic device.

(1) LTPS Screen

If the screen type is an LTPS screen, it is continued to be determined whether the current frame rate switching instruction directs a switch from a high frame rate to a low frame rate. If the frame rate switching instruction directs a switch from a high frame rate to a low frame rate, the frame rate control method provided in this application is triggered. If the frame rate switching instruction directs a switch from a low frame rate to a high frame rate, an original frame rate control method is performed. To be specific, the frame rate switching instruction is directly issued to the display driver.

For example, the APP running on the electronic device is switched from a video APP to a reader APP. A frame rate required by the video APP is 120 Hz, and a frame rate required by the reading APP is 60 Hz. In other words, the frame rate is switched from 120 Hz to 60 Hz. Furthermore, the TE frequency of the DDIC used in the electronic device takes effect with a delay of two frames.

Figure 8:
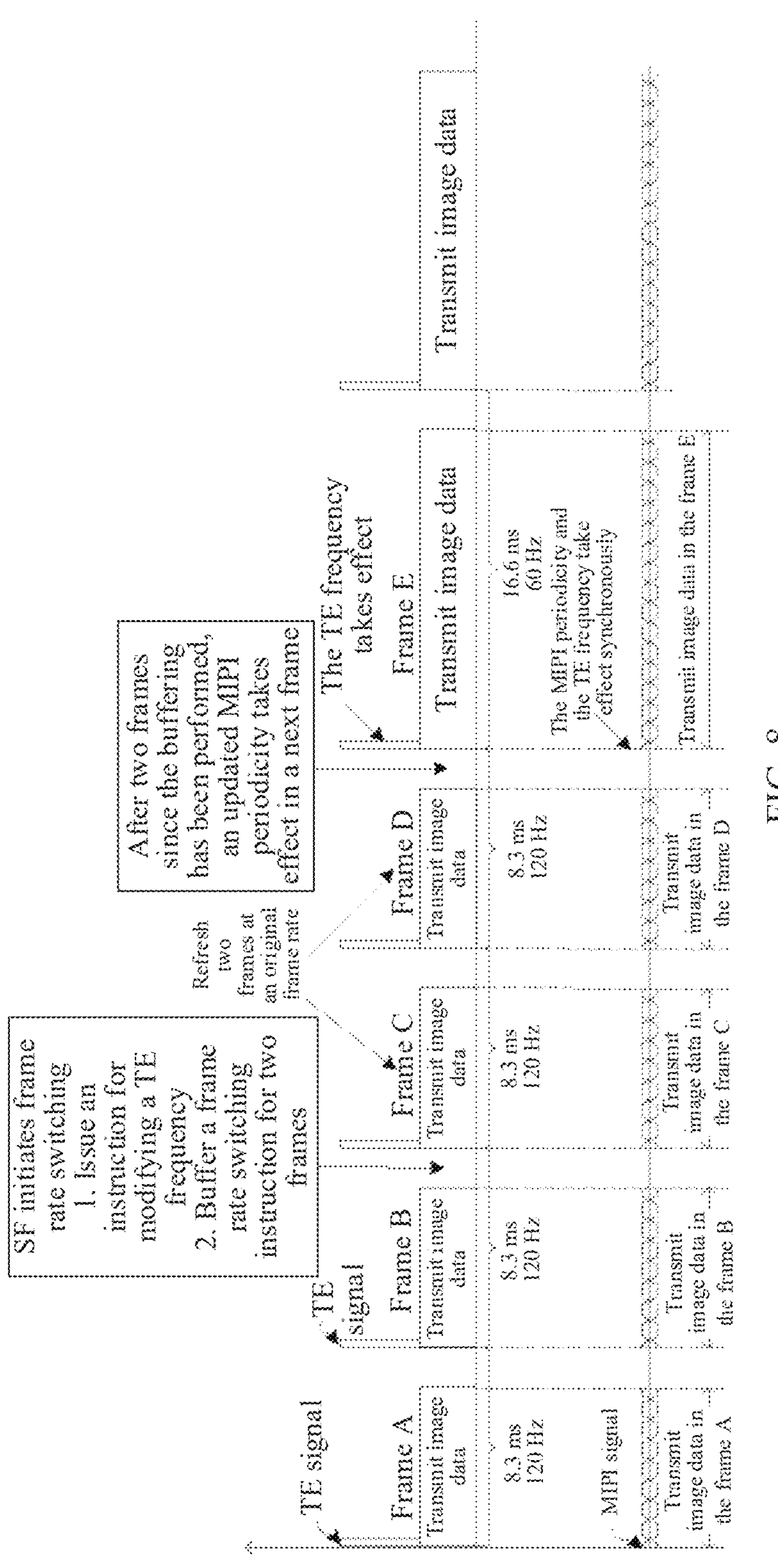
FIG. 8 is a schematic diagram of frame rate switching of an LPTS screen according to an embodiment of this application.

The following describes, with reference to FIG. 6 and FIG. 8, a process of switching from 120 Hz to 60 Hz of the electronic device with the LTPS screen.

For example, as shown in FIG. 8, a frame rate of a frame A is 120 Hz, and SurfaceFlinger initiates a switch of a frame rate to 60 Hz after transmission of image data in a frame B is completed. As shown in FIG. 6, the buffer module in the HWC buffers the received frame rate switching instruction and triggers the counting module to count a quantity of frames of the image data received by the HWC. At the same time, the HWC issues a TE frequency adjustment instruction to the display driver through channel 1 (or referred to as a first channel) between the HWC and the display driver in the frame B. Upon receipt of the TE frequency adjustment instruction, the display driver issues the TE frequency adjustment instruction to the data processing unit (DPU). Further, the DPU sends the TE frequency adjustment instruction to the DDIC through a MIPI, and the DDIC adjusts the TE frequency in response to the TE frequency adjustment instruction. The TE frequency is a frequency at which the DDIC outputs a TE signal, that is, the frame rate. A modified TE frequency takes effect after two frames since the TE frequency adjustment instruction has been issued. In other words, the modified TE frequency takes effect in a frame E.

In addition, as shown in FIG. 6, when a count value of the counting module reaches 2, a MIPI signal adjustment instruction (or the frame rate switching instruction) is issued through channel 2 (or referred to as a second channel) between the HWC and the display driver. In other words, the HWC does not issue the frame rate switching instruction in the frame B and the frame C, and upon receipt of image data in a frame D, the HWC issues the frame rate switching instruction to the display driver. Upon receipt of the frame rate switching instruction, the display driver determines a target periodicity of a MIPI signal that matches a target frame rate, and adjusts a periodicity of a MIPI signal of the data processing unit to the target periodicity of the MIPI signal. The modified MIPI signal periodicity takes effect immediately in a next periodicity. As shown in FIG. 8, the modified MIPI signal takes effect in the frame E.

As shown in FIG. 8, a periodicity of the TE signal in the frame E becomes 16.6 ms. At the same time, the periodicity of the MIPI signal lengthens. In other words, time for transmitting image data through the MIPI in one periodicity is increased. It can be learned that the TE frequency and MIPI signal take effect synchronously in the frame E, and finally the frame rate switching from 120 Hz to 60 Hz is performed. Moreover, it may be learned from FIG. 8, frame rates in the frame C and the frame D are still 120 Hz, with no frame loss or non-composition issues occurring.

(2) LTPO Screen

Based on the foregoing frame rate adjustment principle of the LTPO screen, during the frame rate switching of the LTPO screen, there is no need to modify the periodicity of the MIPI signal, and only the TE frequency needs to be modified.

If the screen type is an LTPO screen, it is continued to be determined whether the current frame rate switching instruction directs a switch from 90 Hz to 60 Hz. If the frame rate switching instruction directs a switch from 90 Hz to 60 Hz, the frame rate control method provided in this application is triggered. If the frame rate switching instruction does not direct a switch from 90 Hz to 60 Hz, an original frame rate control method is performed, in other words, the frame rate switching instruction is directly issued to the display driver.

Figure 9:
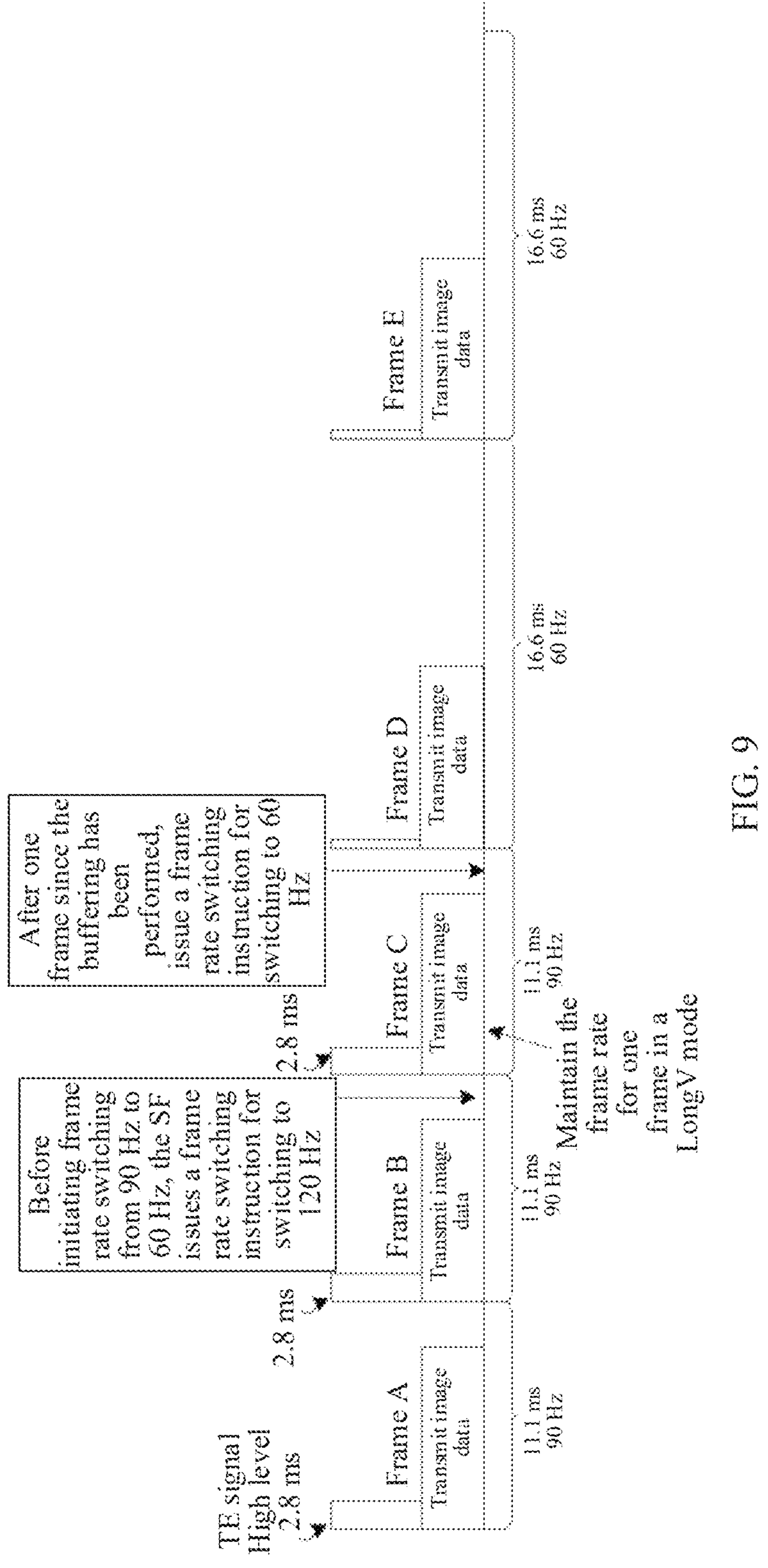
FIG. 9 is a schematic diagram of frame rate switching of an LTPO screen according to an embodiment of this application.

The following describes, with reference to FIG. 7 and FIG. 9, a process of switching from 90 Hz to 60 Hz of the electronic device with the LTPO screen.

As shown in FIG. 9, a frame rate in a frame A is 90 Hz, and the HWC receives the frame rate switching instruction for switching from 90 Hz to 60 Hz issued from SurfaceFlinger after transmission of image data in a frame B is completed. As shown in FIG. 7, the HWC first issues the frame rate switching instruction for switching to 120 Hz (or referred to as a first frame rate switching instruction) to the display driver through channel 1. After receiving the first frame rate switching instruction, the display driver issues the first frame rate switching instruction to the DPU, and the DPU further issues the first frame rate switching instruction to the DDIC through the MIPI. The DDIC adjusts the TE frequency in response to the first frame rate switching instruction. However, duration of a high-level part of the TE cannot be modified in a timely manner. Therefore, duration of the high-level part of the TE in a next periodicity remains at 2.8 ms, and duration of a low-level part is modified to a periodicity of 8.3 ms corresponding to 120 Hz. As shown in FIG. 9, the next periodicity (that is, a frame C) after the first frame rate switching instruction is received is still: 2.8+8.3=11.1 ms, that is, at 90 Hz.

As shown in FIG. 7, in the next periodicity (that is, the frame C) after the first frame rate switching instruction is received, the HWC issues a frame rate switching instruction for switching to 60 Hz (or referred to as a second frame rate switching instruction) to the display driver through channel 2. After receiving the second frame rate switching instruction, the display driver issues the second frame rate switching instruction to the DPU, the DPU further issues the second frame rate switching instruction to the DDIC through the MIPI, and the DDIC adjusts the TE frequency in response to the second frame rate switching instruction. In a next periodicity (that is, a frame D) after the second frame rate switching instruction is issued, the high-level part of the TE signal has been modified to a narrow level corresponding to 120 Hz, and duration of the low-level part has been modified to a periodicity of 16.6 ms corresponding to 60 Hz. In other words, the TE frequency in the frame D is switched to 60 Hz.

From the foregoing frame rate control process, it can be learned that during switching from 90 Hz to 60 Hz of the LTPO screen, upon receipt of the frame rate switching instruction issued by SurfaceFlinger, the HWC first issues to the display driver the first frame rate switching instruction for switching to 120 Hz, and after one frame, issues the frame rate switching instruction for switching to 60 Hz.

Figure 10:
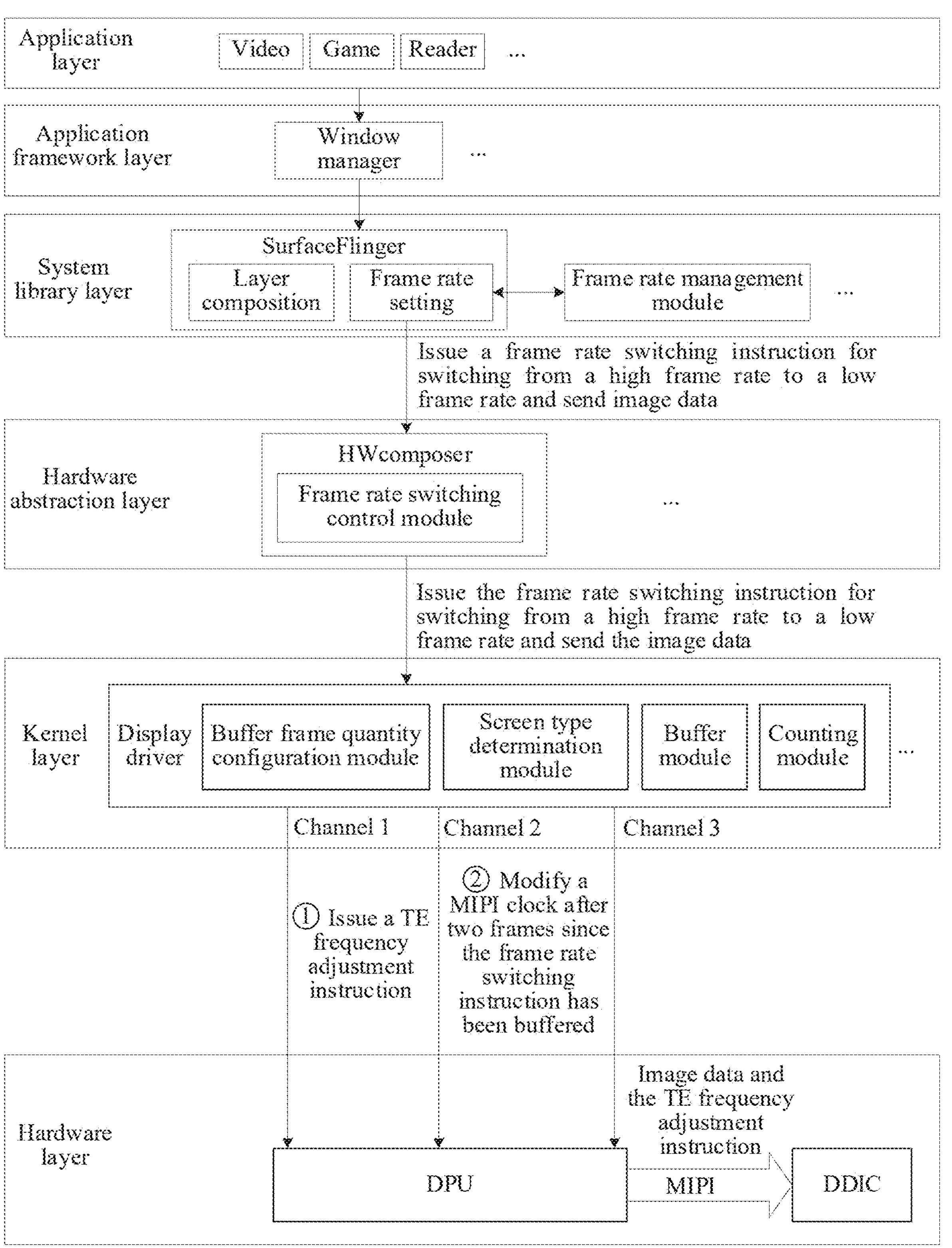
FIG. 10 is a schematic diagram of another software architecture of an electronic device using an LTPS screen according to an embodiment of this application.
Figure 11:
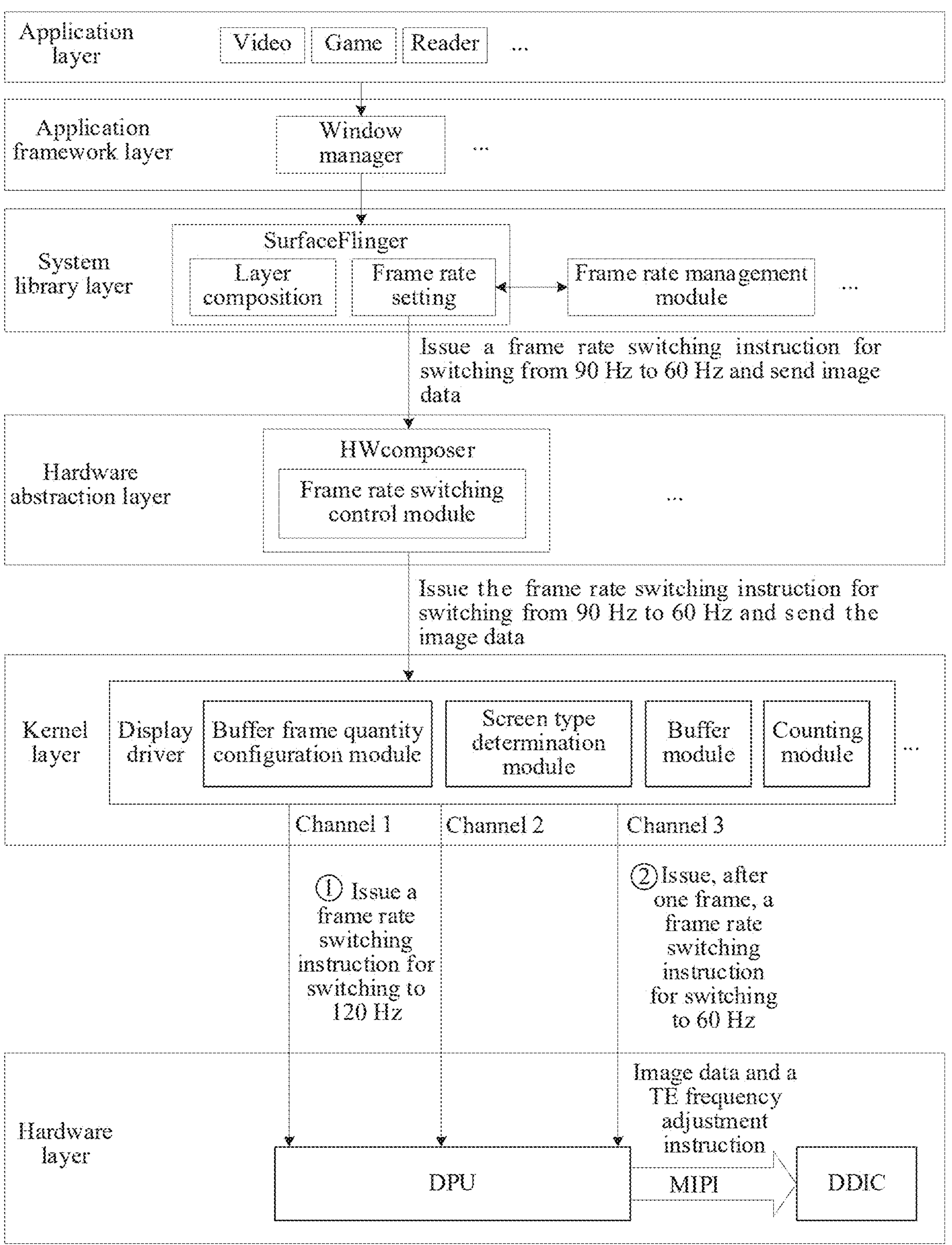
FIG. 11 is a schematic diagram of another software architecture of an electronic device using an LTPO screen according to an embodiment of this application.

In another embodiment of this application, execution logic of the HWC shown in FIG. 6 and FIG. 7 may alternatively be executed by a display driver module. FIG. 10 is a diagram of another software architecture of an electronic device using an LTPS screen according to an embodiment of this application. FIG. 11 is a diagram of another software architecture of an electronic device using an LTPO screen according to an embodiment of this application.

The software architectures of the embodiments shown in FIG. 10 and FIG. 11 differ from that in FIG. 6 and FIG. 7 in: Processing logic such as buffer of a frame rate switching instruction and counting is executed by the display driver instead of the HWC. As shown in FIG. 10 and FIG. 11, the display driver module includes a screen type determination module, a buffer module, a counting module, and a buffer frame quantity configuration module. Functions of the modules are the same as the functions of the same modules in FIG. 6 and FIG. 7. The HWC includes a frame rate switching control module.

When there is a need to switch a frame rate, SurfaceFlinger issues a frame rate switching instruction when sending the image data to the HWC. The HWC directly issues the frame rate switching instruction to the display driver. Upon receipt of the frame rate switching instruction, the display driver determines, by using the screen type determination module, whether a screen type of the electronic device is an LTPS screen or an LTPO screen.

As shown in FIG. 10, if the screen type is an LTPS screen, a buffer module in the display driver buffers the frame rate switching instruction and records a quantity of frames of image data sent by the HWC to the display driver. At the same time, the display driver may issue a TE frequency adjustment instruction to a DPU through channel 1. Further, the DPU issues a TE frequency adjustment instruction to a DDIC, and the DDIC adjusts a TE frequency in response to the TE frequency adjustment instruction. When a quantity of buffer frames for the frame rate switching instruction reaches 2, the display driver triggers the DPU to modify a MIPI signal periodicity.

As shown in FIG. 11, if a screen type is an LTPO screen, upon receipt of a frame rate switching instruction for switching from 90 Hz to 60 Hz issued by the HWC, the display driver first issues a frame rate switching instruction for switching from 90 Hz to 120 Hz to the DPU through channel 1, and after one frame, issues a frame rate switching instruction for switching from 120 Hz to 60 Hz to the DPU through channel 3.

The process of the frame rate control method provided in this application is described in detail below with reference to a frame rate control method flowchart shown in FIG. 12A to FIG. 12C. In this embodiment, the frame rate control process is merely described by using a scenario of switching from the video APP to the reading APP as shown in FIG. 1 as an example. The reading APP may alternatively be another application that displays an image and text, such as WeChat® APP, Zhihu APP, or a browser. The video APP may alternatively be another application that can play a video, such as another video player or a video platform APP.

Figure 12A:
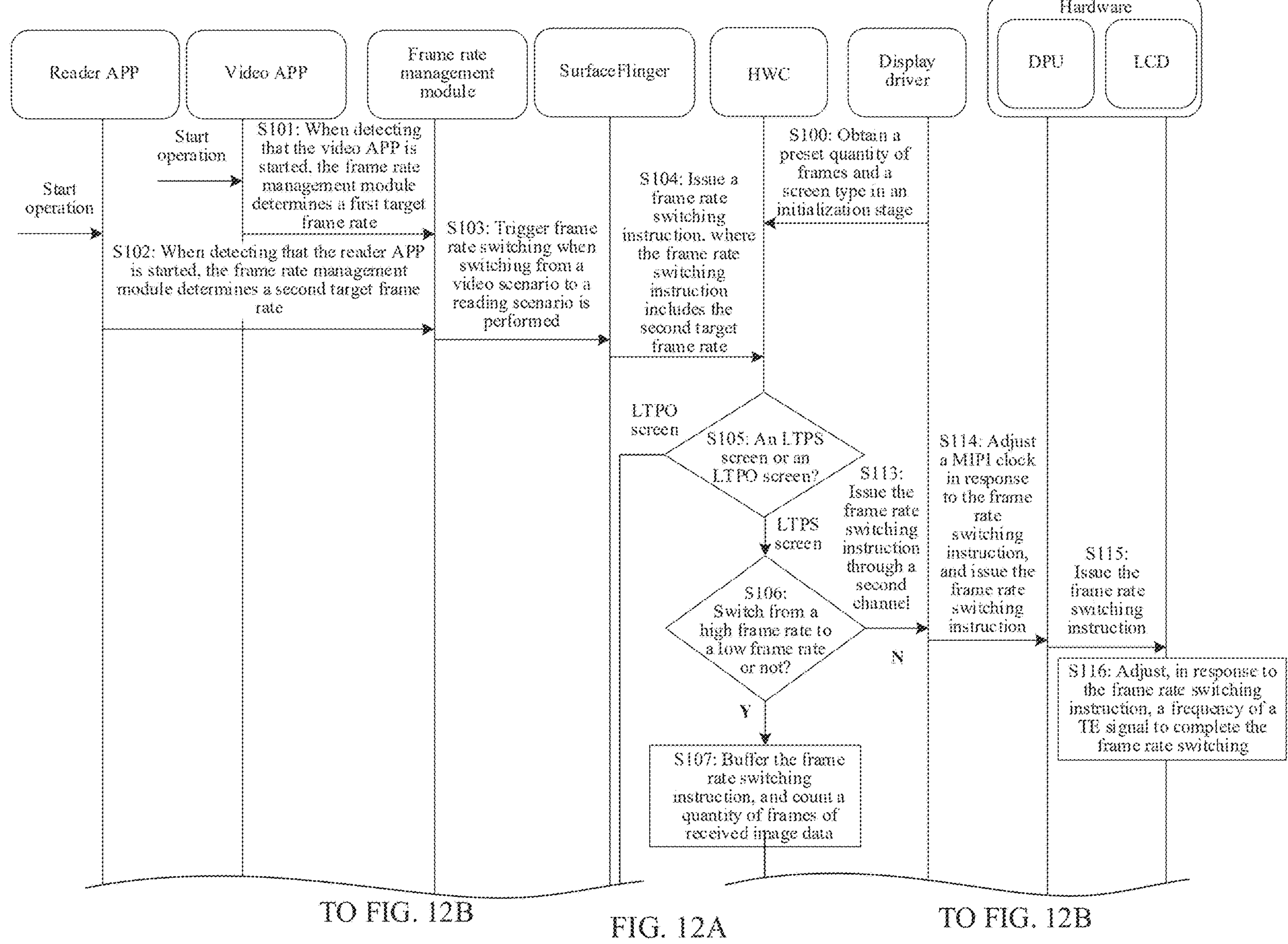
FIG. 12A to FIG. 12C are a flowchart of a frame rate control method according to an embodiment of this application.
Figure 12B:
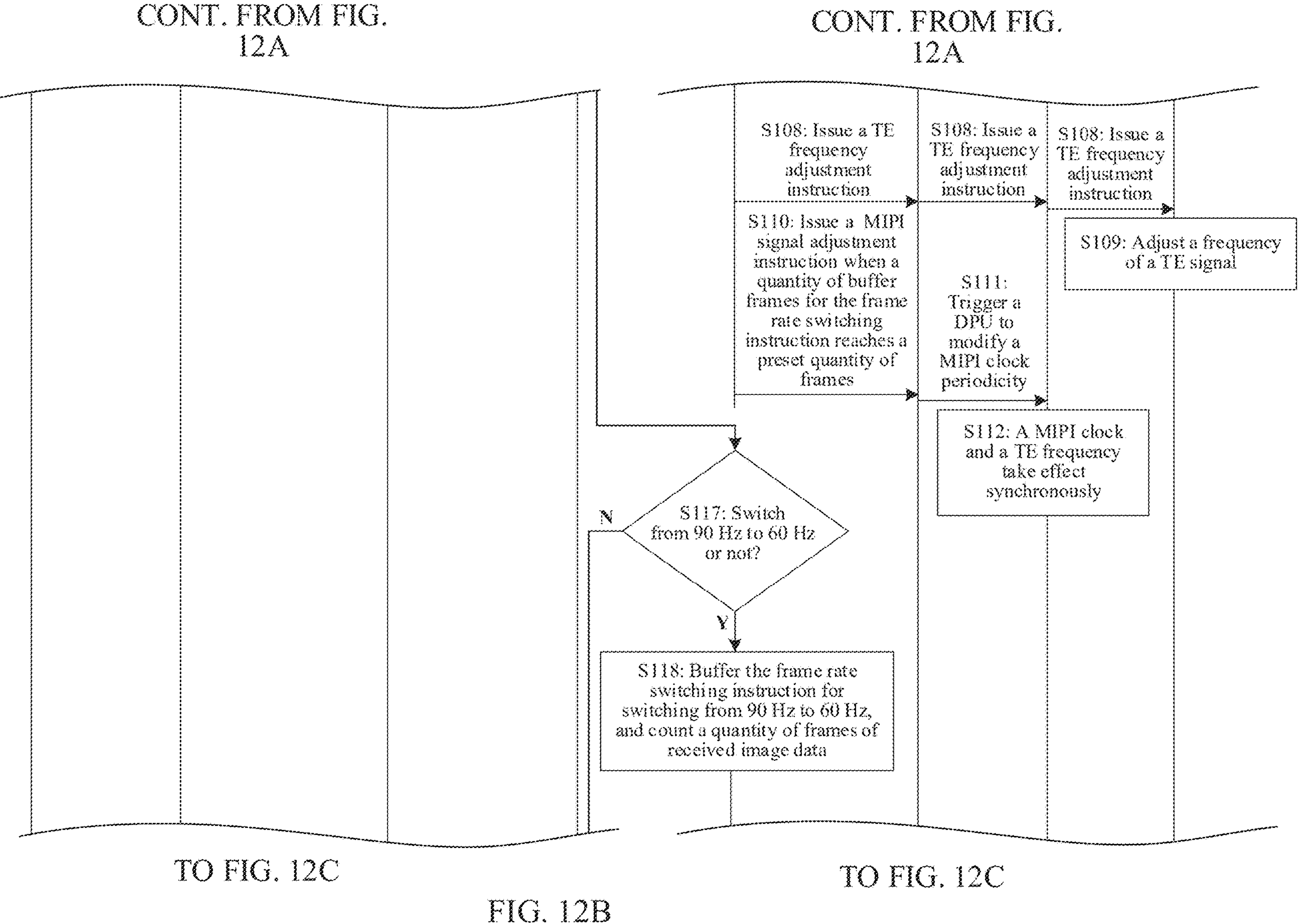
Figure 12C:
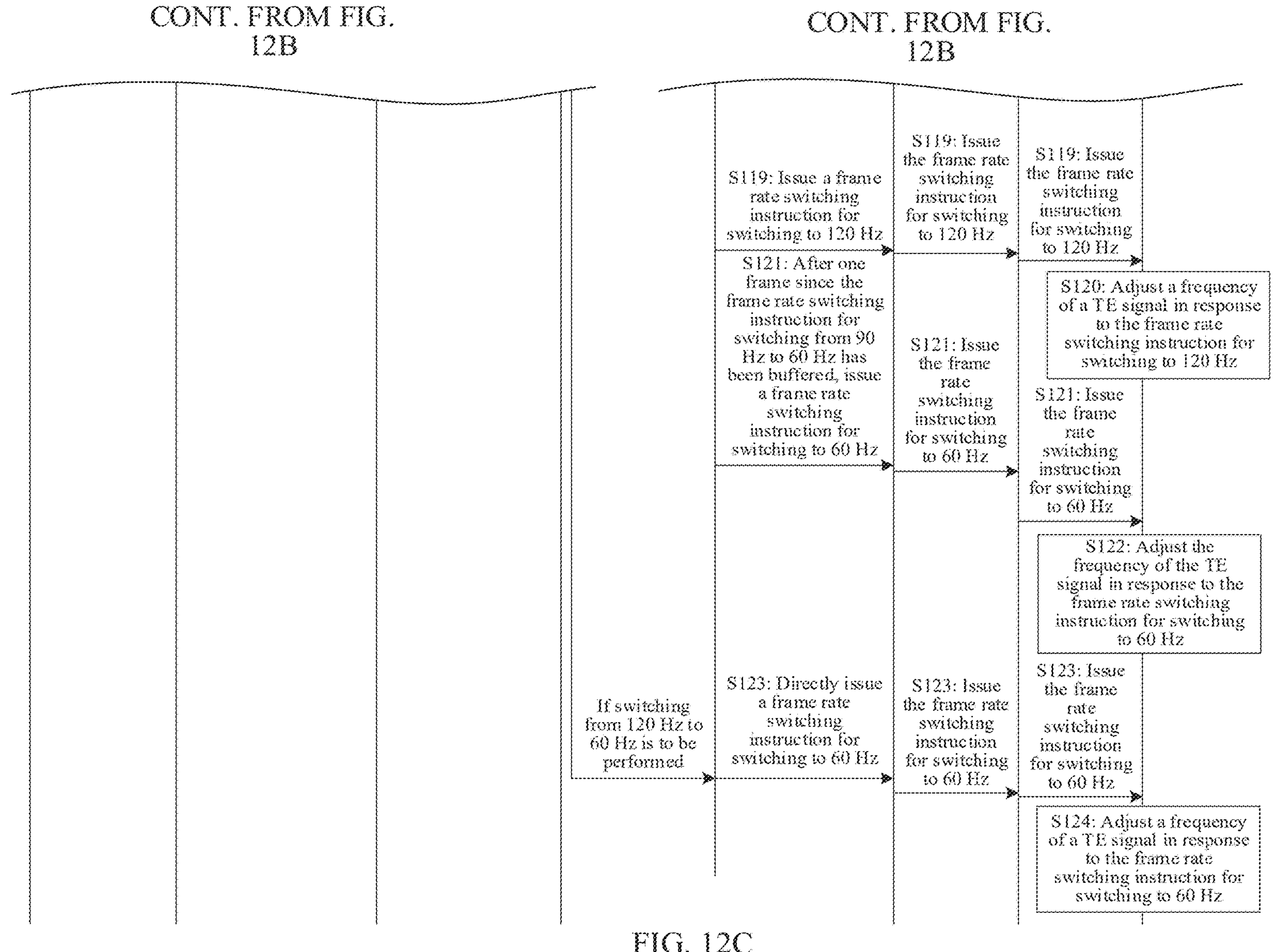

As shown in FIG. 12A to FIG. 12C, the frame rate control process may include:

S100: In an initialization stage, an HWC obtains a screen type of a current electronic device and a preset quantity of frames through a channel (such as channel 3 in FIG. 7) between a display driver and the HWC.

The preset quantity of frames is a quantity of frames delayed for a modified TE frequency to take effect since a frame rate switching instruction has been received by a DDIC. For example, for some DDICs, a modified TE frequency takes effect with a delay of two frames, and for some DDIC's, a modified TE frequency takes effect with a delay of one frame. When a DDIC is determined, the quantity of frames delayed for the TE frequency to take effect may be determined. The quantity of frames delayed is usually used as a performance parameter of the DDIC.

In an embodiment, the screen type of the electronic device and the preset quantity of frames are written into code of the display driver, and during the initialization stage of an operating system of the electronic device, the HWC reads the two pieces of information from the display driver.

S101: When detecting that the video APP is started, a frame rate management module determines a first target frame rate to enable the electronic device to display an image at the first target frame rate.

When detecting that the video APP is started, the frame rate management module determines a target frame rate that matches the video APP, that is, the first target frame rate. Usually, the video APP requires a high frame rate, such as 120 Hz or 90 Hz.

A service scenario may refer to a service of an APP currently running in a foreground of the electronic device.

For example, after a switch from an APP requiring a first frame rate (120 Hz) to an APP requiring a second frame rate (90 Hz) on the electronic device, it is determined that a frame rate requirement of the service scenario changes.

S102: When detecting that the reading APP is started, the frame rate management module determines a second target frame rate that matches the reading APP.

After the service scenario of the electronic device changes, the frame rate management module may analyze a frame rate requirement corresponding to a current service scenario, that is, determine a target frame rate corresponding to the current service scenario. For example, if the current service scenario is an image viewing and text reading scenario, then the second target frame rate matching the reading scenario is determined.

S103: The frame rate management module triggers SurfaceFlinger to initiate frame rate switching when detecting that the reading APP is started.

In one example, the electronic device may trigger SurfaceFlinger to initiate frame rate switching during a startup of the reading APP.

In another example, the electronic device may trigger SurfaceFlinger to initiate frame rate switching after the reading APP is started.

When detecting that a frame rate of the reading APP is different from the first target frame rate, the frame rate management module sends the second target frame rate to SurfaceFlinger and triggers SurfaceFlinger to initiate frame rate switching.

S104: SurfaceFlinger issues a frame rate switching instruction to the HWC, where the frame rate switching instruction includes the second target frame rate.

S105: The HWC determines whether a screen of the electronic device is an LTPS screen or an LTPO screen; and if the screen is an LTPS screen, performs S106; or if the screen is an LTPO screen, performs S115.

After the step of determining the screen type is added in the frame rate switching processing logic, there is no need to develop different frame rate switching processing logic for different screen types. Same frame rate switching processing logic may be used for electronic devices using the LTPS screen and the LTPO screen, thereby expanding the application range of a frame rate switching control program and reducing development workload of developers.

Certainly, in other embodiments of this application, there is no need to determine the type of the screen currently used by the electronic device. The screen type of the electronic device is determined when the electronic device leaves a factory. Therefore, only a logical processing flow corresponding to the screen type needs to be executed. For example, for an electronic device with an LTPS screen, S106 to S116 may be directly performed. For an electronic device with an LTPO screen, S117 to S124 may be directly performed. In this way, for the electronic device with the LTPS (or LTPO) screen, only a program code part corresponding to the LTPS (or LTPO) screen needs to be installed, and a program code part corresponding to the LTPO (or LTPS) screen does not need to be installed. In this way, storage space occupied by the program code is reduced.

S106: The HWC determines whether the frame rate switching is to switch from a high frame rate to a low frame rate; if frame rate switching is to switch from a high frame rate to a low frame rate, performs S107; or if frame rate switching is not to switch from a high frame rate to a low frame rate, performs S113.

The HWC may obtain from the system a running frame rate corresponding to a previous service scenario (that is, the first target frame rate), and at the same time, may further obtain the second target frame rate from the frame rate switching instruction issued by SurfaceFlinger. The HWC may determine whether the current frame rate switching instruction directs a switch from a high frame rate to a low frame rate or from a low frame rate to a high frame rate.

S107: The HWC buffers the frame rate switching instruction issued by SurfaceFlinger, and counts a quantity of frames of image data sent by SurfaceFlinger.

After receiving the frame rate switching instruction issued by SurfaceFlinger, the HWC does not issue the frame rate switching instruction immediately but buffers the frame rate switching instruction first. For example, the HWC stores the received frame rate switching instruction in memory space allocated for the HWC.

S108: The HWC issues a TE frequency adjustment instruction to the display driver through the first channel, and the display driver issues the TE frequency adjustment instruction to the DDIC.

In an embodiment, S107 and S108 may be performed synchronously. Alternatively, S107 may be performed before S108. For example, S107 is performed at a moment t1, and S108 is performed at a moment t2, where t1 and t2 are different moments in a same periodicity.

The first channel in this embodiment refers to a newly added channel between the HWC and the display driver. A purpose of adding the first channel between the HWC and the display driver is to avoid affecting original frame rate switching instruction processing logic. In this way, when the current frame rate switching is not to switch from a high frame rate to a low frame rate, the original frame rate switching processing logic may be directly used.

The HWC parses the received frame rate switching instruction to obtain the target frame rate (that is, the second target frame rate), where the target frame rate is a target frequency of a TE signal output by the DDIC, and issues a TE frequency adjustment instruction to the display driver through the first channel, where the TE frequency adjustment instruction includes the target frequency.

The display driver continues to issue the received TE frequency adjustment instruction to the data processing unit (DPU), and the DPU continues to issue the TE frequency adjustment instruction to the DDIC.

S109: The DDIC adjusts, in response to the TE frequency adjustment instruction, a frequency of the TE signal to the target frequency matching the target frame rate.

For example, as shown in FIG. 8, after the instruction for modifying the TE frequency is issued in the frame B, the TE frequency modified by the DDIC takes effect after two frames since the TE frequency adjustment instruction has been issued. In other words, the modified TE frequency takes effect in the frame E.

S110: When a quantity of buffer frames of the frame rate switching instruction reaches a preset quantity of frames, issue a MIPI signal adjustment instruction to the display driver through a second channel.

The quantity of buffer frames of the frame rate switching instruction in this embodiment refers to a quantity of image frames received by the HWC since the frame rate switching instruction has been buffered. The preset quantity of frames is the first quantity mentioned above.

After the HWC buffers the frame rate switching instruction, a count of a counter is increased by 1 each time the counter receives image data sent by SurfaceFlinger. When a count value reaches the preset quantity of frames, the HWC issues the MIPI signal adjustment instruction to the display driver.

For example, the preset quantity of frames corresponding to the DDIC is 2. As shown in FIG. 8, the HWC buffers, in the frame B, the frame rate switching instruction issued by SurfaceFlinger. When a rising edge of a next TE signal (that is, the TE signal in the frame C) arrives, SurfaceFlinger sends the image data to the HWC, and the count of the counter is increased by 1. Similarly, when the TE signal in the frame D is detected, the count of the counter is further increased by 1. In this case, the count value is 2, reaching the preset quantity of frames, and the MIPI signal adjustment instruction is issued to the display driver through the second channel.

In this embodiment, the second channel may be an original channel between the HWC and the display driver.

A function of the MIPI signal adjustment instruction is to cause the display driver to adjust a MIPI signal periodicity of the data processing unit.

In an embodiment, the HWC issues the instruction (or notification) for adjusting the MIPI signal to the display driver, and the MIPI signal adjustment instruction includes the target frame rate. The display driver may determine, based on the target frame rate, a target periodicity of the MIPI signal that matches the target frame rate. Further, the periodicity of the MIPI signal of the data processing unit is configured as the target periodicity. For example, the display driver may configure the periodicity of the MIPI signal through a MIPI signal configuration interface.

In other embodiments of this application, the HWC may alternatively issues the received frame rate switching instruction directly to the display driver through the second channel.

In other embodiments of this application, the TE frequency adjustment instruction and the MIPI signal adjustment instruction may alternatively be issued to the display driver through the original channel (that is, the second channel) between the HWC and the display driver. In this case, the processing logic of the display driver needs to be modified. For example, the display driver needs to distinguish whether the instruction received through the second channel is a TE frequency adjustment instruction or a MIPI signal adjustment instruction. For the TE frequency adjustment instruction, the display driver issues the instruction to the DDIC, to allow the DDIC to adjust the frequency of the TE signal based on the instruction. For the MIPI signal adjustment instruction, the display driver reconfigures the MIPI signal periodicity of the DPU.

S111: The display driver triggers the DPU to modify the MIPI signal periodicity in response to the MIPI signal adjustment instruction.

Upon receipt of the MIPI signal adjustment instruction, the display driver needs to reconfigure the MIPI signal periodicity of the DPU.

S112: A modified MIPI signal and a modified TE frequency take effect synchronously.

Taking effect synchronously here means that the modified MIPI signal and the modified TE frequency take effect in a same periodicity.

The TE frequency adjustment instruction is issued to the DDIC immediately after the HWC receives the frame rate switching instruction, and the MIPI signal adjustment instruction is issued after the preset quantity of frames (for example, two frames) since the TE frequency adjustment instruction has been issued. Moreover, the TE frequency takes effect after two frames since the TE frequency adjustment instruction has been issued, while the MIPI signal takes effect immediately in a next screen refresh periodicity (that is, a next frame) after the MIPI signal adjustment instruction is issued. Therefore, the modified TE frequency and the modified MIPI signal take effect in the same periodicity.

As an example, as shown in FIG. 8, the TE frequency adjustment instruction is issued in the frame B, and the adjusted TE frequency takes effect in the frame E. The frame rate switching instruction is buffered in the frame B, and the frame rate switching instruction (or the MIPI signal adjustment instruction) is sent to the display driver after two frames, that is, the MIPI signal adjustment instruction is issued in the frame D. Moreover, the adjusted MIPI signal takes effect in a next frame after the MIPI signal adjustment instruction is issued. In other words, the adjusted MIPI signal takes effect in the frame E. It can be learned that the TE frequency and MIPI signal take effect synchronously in the frame E.

S113: The HWC issues the frame rate switching instruction to the display driver through a second channel.

If the HWC determines that the current frame rate switching instruction directs a switch from a low frame rate to a high frame rate, the HWC executes original frame rate switching processing logic, that is, issues the frame rate switching instruction to the display driver through the original second channel between the HWC and the display driver.

S114: The display driver adjusts a MIPI signal periodicity of the DPU in response to the frame rate switching instruction, and issues the frame rate switching instruction to the DPU.

Upon receipt of the frame rate switching instruction issued by the HWC, the display driver first sends the frame rate switching instruction to the DDIC (for example, the display driver issues the frame rate switching instruction to the DPU, and the DPU further sends the frame rate switching instruction to the DDIC through the MIPI), and then adjusts the MIPI signal periodicity of the DPU.

S115: The DPU issues the frame rate switching instruction to the DDIC through the MIPI.

S116: The DDIC adjusts, in response to the frame rate switching instruction, the frequency of the TE signal to complete the frame rate switching.

For example, if the frame rate switching is to switch from 90 Hz to 120 Hz, then, upon receipt of the frame rate switching instruction, the DDIC adjusts the periodicity of the TE signal to 8.3 ms, that is, a frame rate is adjusted to 120 Hz.

S117: The HWC determines whether the current frame rate switching is to switch from 90 Hz to 60 Hz; and if the current frame rate switching is to switch from 90 Hz to 60 Hz, performs S118, or if the current frame rate switching is not to switch from 90 Hz to 60 Hz, performs S123.

If the HWC determines that the screen of the electronic device is the LTPO screen, the HWC continues to determine whether the frame rate switching is to switch from 90 Hz to 60 Hz, 40 Hz, 30 Hz, or the like. If the frame rate switching is to switch from 90 Hz to 60 Hz, 40 Hz, 30 Hz, or the like, S116 to S120 are performed. If the frame rate switching is not to switch from 90 Hz to 60 Hz, 40 Hz, 30 Hz, or the like, S121 to S122 are performed.

S118: The HWC buffers the frame rate switching instruction for switching from 90 Hz to 60 Hz, and counts the quantity of frames of the received image data.

After receiving the frame rate switching instruction for switching to 60 Hz (that is, the original frame rate switching instruction) issued by SurfaceFlinger, the HWC does not directly send the frame rate switching instruction to the display driver, but buffers the received frame rate switching instruction. Moreover, the count of the counter is increased by 1 each time the image data sent by SurfaceFlinger is received.

For example, as shown in FIG. 9, the HWC buffers the received frame rate switching instruction in the frame B, and after the TE signal arrives in the next periodicity (that is, the TE signal arrives in the frame C), the count value of the counter is increased by 1.

S119: The HWC issues a first frame rate switching instruction for switching to 120 Hz to the display driver through a first channel, and the display driver issues the first frame rate switching instruction to the DDIC.

While buffering the original frame rate switching instruction, the HWC issues the frame rate switching instruction for switching to 120 Hz to the display driver through the first channel. Further, the display driver first issues the first frame rate switching instruction to the DPU through the channel between the display driver and the DPU, and the DPU sends the first frame rate switching instruction to the DDIC through MIPI.

In embodiments of this application, the first channel may be a newly added channel between the HWC and the display driver, so that there is no need to modify the original frame rate control processing logic.

S120: The DDIC adjusts the frequency of the TE signal in response to the first frame rate switching instruction.

As shown in FIG. 9, after the HWC issues, to the display driver in the frame B, the first frame rate switching instruction for switching to 120 Hz, duration of a high-level part of the TE signal in the next frame (that is, the frame C) cannot be adjusted in a timely manner and remains at 2.8 ms, and duration of a low-level part of the TE signal is adjusted to a periodicity of 8.3 ms corresponding to 120 Hz. Therefore, the frame rate in the frame C is still 90 Hz, until the high-level part of the TE signal in the frame D is adjusted to a narrow level.

S121: After one frame since the frame rate switching instruction for switching from 90 Hz to 60 Hz has been buffered, a second frame rate switching instruction for switching to 60 Hz is issued to the display driver through the second channel, and the display driver issues the second frame rate switching instruction to the DDIC.

For example, as shown in FIG. 9, after the HWC issues the frame rate switching instruction for switching to 120 Hz in the frame B, the count of the counter is triggered to be increased by 1 when the image data is received in the frame C. In this case, the count value reaches 1, and the HWC issues to the display driver the buffered frame rate switching instruction for switching to 60 Hz. The display driver further issues to DDIC the frame rate switching instruction for switching to 60 Hz.

In other embodiments of this application, the first frame rate switching instruction and the second frame rate switching instruction may both be issued to the display driver through the original channel between the HWC and the display driver. This is not limited in this application.

In other embodiments of this application, the frame rate switching instruction for switching from 90 Hz to 60 Hz may not be buffered. It is only necessary to record a screen refresh periodicity in which the HWC receives the frame switching instruction for switching from 90 Hz to 60 Hz, and count a quantity of screen refresh periodicities after the frame switching instruction for switching from 90 Hz to 60 Hz is received. After the counted quantity of screen refresh periodicities reaches 1, the second frame rate switching instruction is generated and issued to the display driver.

S122: The DDIC adjusts the frequency of the TE signal in response to the second frame rate switching instruction.

Upon receipt of the second frame rate switching instruction, the DDIC adjusts the frequency of the TE signal. For example, as shown in FIG. 9, adjustment of the TE frequency from 90 Hz to 120 Hz by the DDIC is triggered in the frame B, and when the high level of the TE signal is adjusted to the narrow level in the frame D, the DDIC further adjust, in response to the second frame rate switching instruction, duration of the low-level part of the TE signal in the frame D to periodicity duration corresponding to 60 Hz, that is, 16.6 ms. It can be learned that after the frame rate switching instruction for switching to 60 Hz is issued in the frame C, the frame rate in the next frame (that is, the frame D) may be adjusted to 60 Hz.

Moreover, according to this solution, a frame loss caused by inability to composite image data in the frame D due to presentFence being not released in a timely manner in the frame C.

S123: The HWC issues the frame rate switching instruction to the display driver through the second channel, and the display driver issues the frame rate switching instruction to the DDIC.

If the frame rate switching is to switch from 120 Hz to 60 Hz, the HWC determines that the frame rate switching is not to switch from 90 Hz to 60 Hz, and performs the original frame rate switching process. To be specific, the HWC issues the frame rate switching instruction to the display driver through the original channel between the HWC and the display driver. Further, the display driver issues the frame rate switching instruction to the DPU, and finally the DPU sends the frame rate switching instruction to the DDIC through the MIPI interface.

S124: The DDIC adjusts the frequency of the TE signal to the target frame rate in response to the frame rate switching instruction.

In an example in which the frame rate switching is to switch from 120 Hz to 90 Hz, upon receipt of the frame rate switching instruction, if the DDIC determines that the target frame rate is 90 Hz, then the DDIC lengthens the duration of the high-level part of the TE signal to 2.8 ms, and the duration of the low-level part remains unchanged at 8.3 ms. Duration of the entire periodicity is: 2.8+8.3=11.1 ms. In other words, the periodicity of the TE signal is adjusted to the duration corresponding to 90 Hz.

Certainly, the frame rate control method provided in this application is also applicable to other frame rate switching scenarios. For example, during running of a same application, a mobile phone displays pages of different content types, such as a page displaying a video and a page displaying an image and text. For another example, during running of a same application, a mobile phone displays a same page flicked with different speeds. For example, when a first page is flicked with a first flicking speed, a frame rate is 60 Hz, and when the first page is in a stationary state, a frame rate is 10 Hz.

According to the frame rate control method provided in this embodiment, upon receipt of the frame rate switching instruction, the HWC first determines the screen type of the electronic device; if the screen type is an LTPS screen, further determines whether the frame rate switching is to switch from a high frame rate to a low frame rate; and if the frame rate switching is to switch from a high frame rate to a low frame rate, buffers the received frame rate switching instruction and counts the quantity of frames of the received image data sent by SurfaceFlinger. Further, the frame rate switching instruction is executed in two steps: first, issuing the TE frequency adjustment instruction to adjust the frequency of the TE signal in a timely manner; and when the count value reaches the preset quantity of frames, issuing the MIPI signal adjustment instruction to adjust the MIPI signal periodicity. The TE frequency adjustment instruction takes effect with a delay, while the MIPI signal adjustment instruction takes effect in a next frame. Therefore, the TE frequency adjustment instruction is issued first, and the MIPI signal adjustment instruction is issued after a preset quantity of frames. In this way, it is ensured that the TE frequency and MIPI signal take effect in a same screen refresh periodicity, thereby avoiding display anomalies caused by the TE frequency and the MIPI signal not taking effect synchronously during frame rate switching, and improving users' viewing experience during the frame rate switching.

If the screen type is an LTPO screen, and it is determined that the frame rate switching is to switch from 90 Hz to 60 Hz (or 40 Hz, 30 Hz, or a lower frame rate), the frame rate switching instruction is executed in two steps: first, issuing the frame rate switching instruction for switching to 120 Hz, and after one frame, issuing the frame rate switching instruction for switching to 60 Hz. For example, the frame rate switching instruction for switching to 120 Hz is issued in the first frame. However, the duration of the high-level part of the TE signal cannot be adjusted in a timely manner. Therefore, the periodicity in the second frame is still 2.8+8.3=11.1 ms. In other words, the frame rate is still 90 Hz, until the high-level part of the TE signal in the next frame (that is, the third frame) is adjusted to a narrow-level part whose duration can be ignored. After the frame rate switching instruction for switching to 60 Hz is issued in the second frame, the high-level part of the TE signal in the third frame has been restored to a narrow level, and only a moment when the high level of the TE signal in the next periodicity arrives needs to be calculated based on 60 Hz. Therefore, the TE signal periodicity in the third frame is adjusted to 16.6 ms, which is the periodicity corresponding to 60 Hz. In this solution, the frame rate switching instruction for switching to 120 Hz is first issued to cause a frame rate of the next frame to remain at 90 Hz, so as to avoid a frame loss caused by directly switching the frame rate from 90 Hz to 60 Hz. The frame rate switching instruction for switching to 60 Hz is issued after one frame to enable the frame rate to be successfully switched to 60 Hz.

Figure 13A:
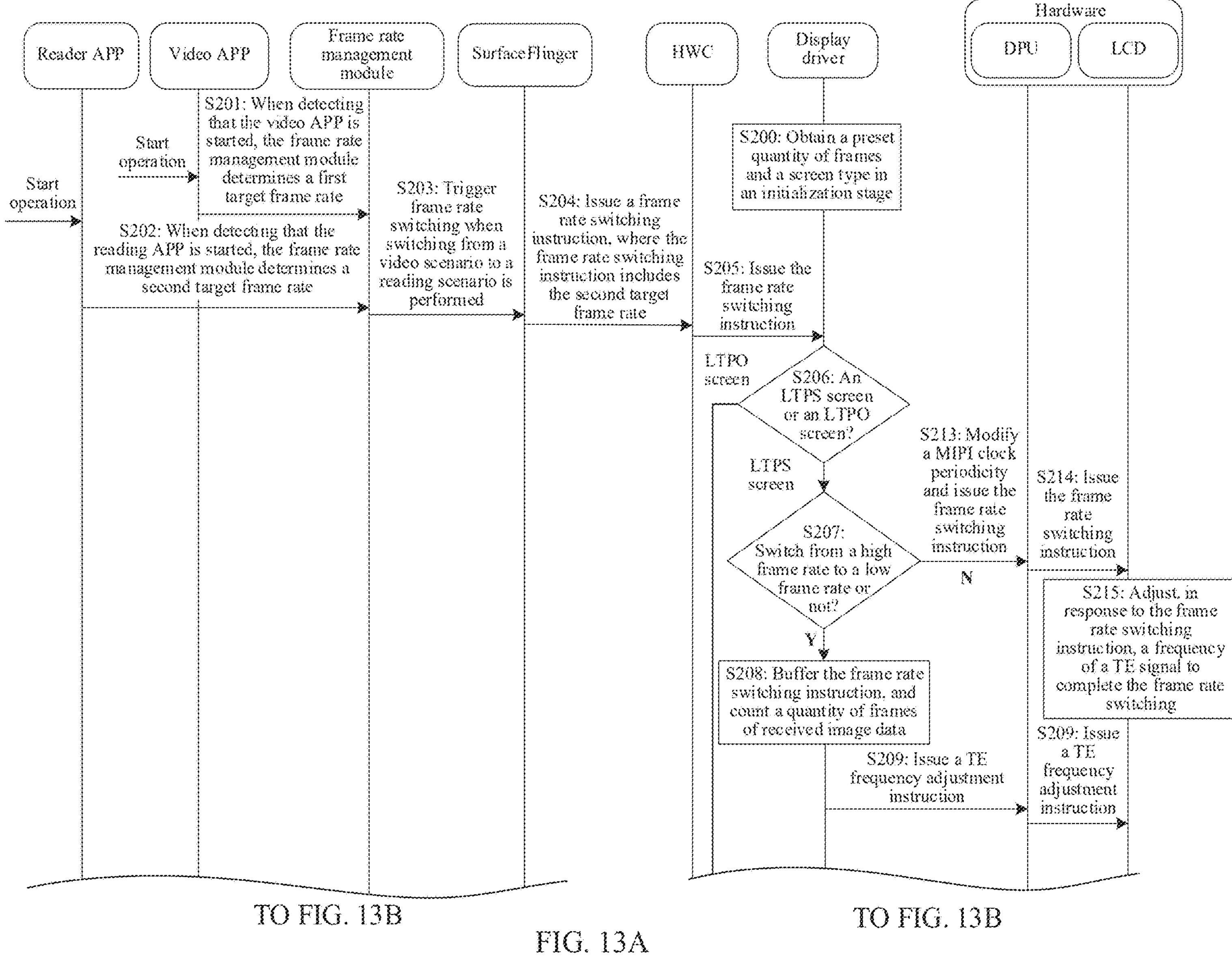
FIG. 13A to FIG. 13C are a flowchart of another frame rate control method according to an embodiment of this application.
Figure 13B:
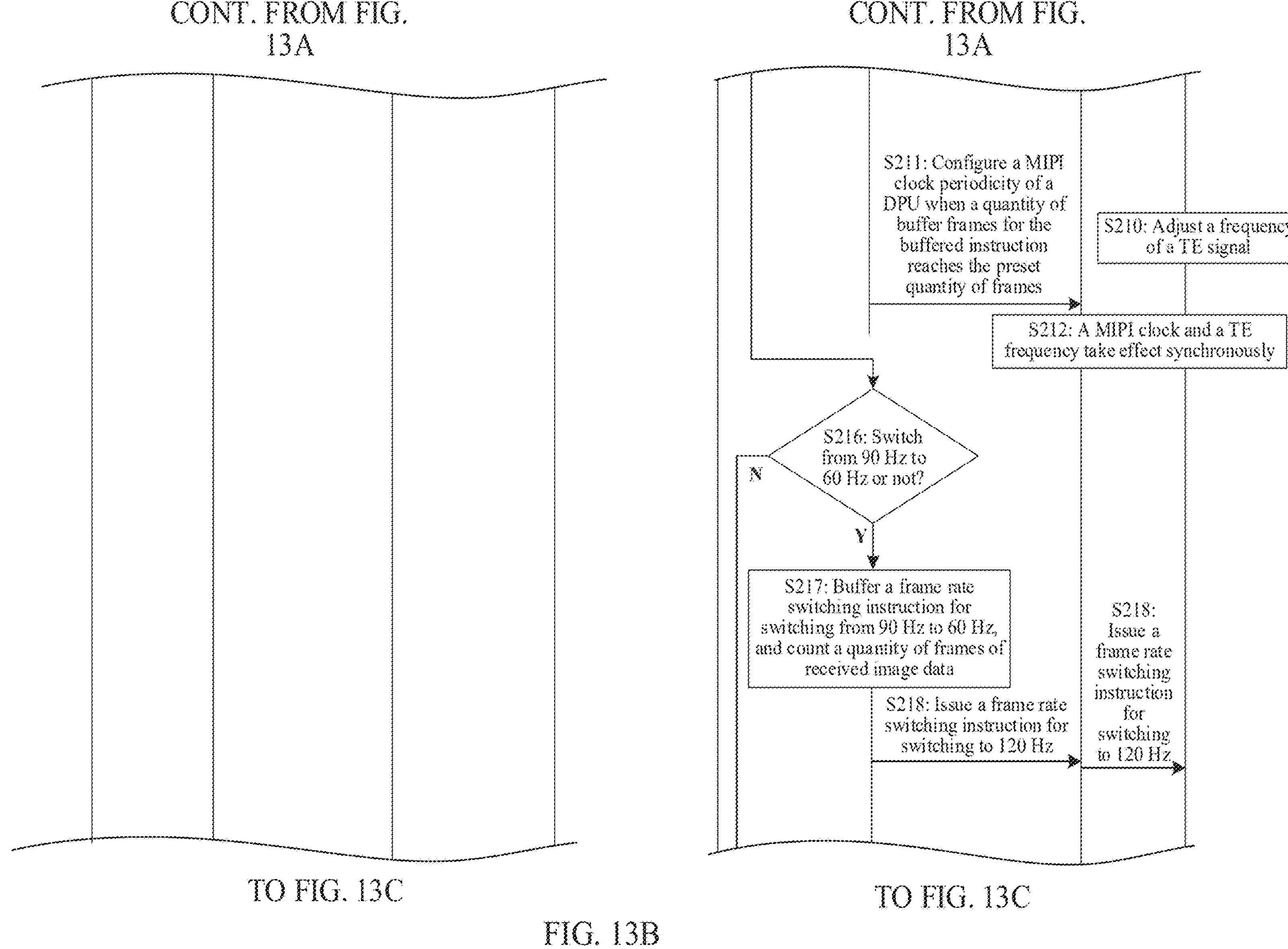
Figure 13C:
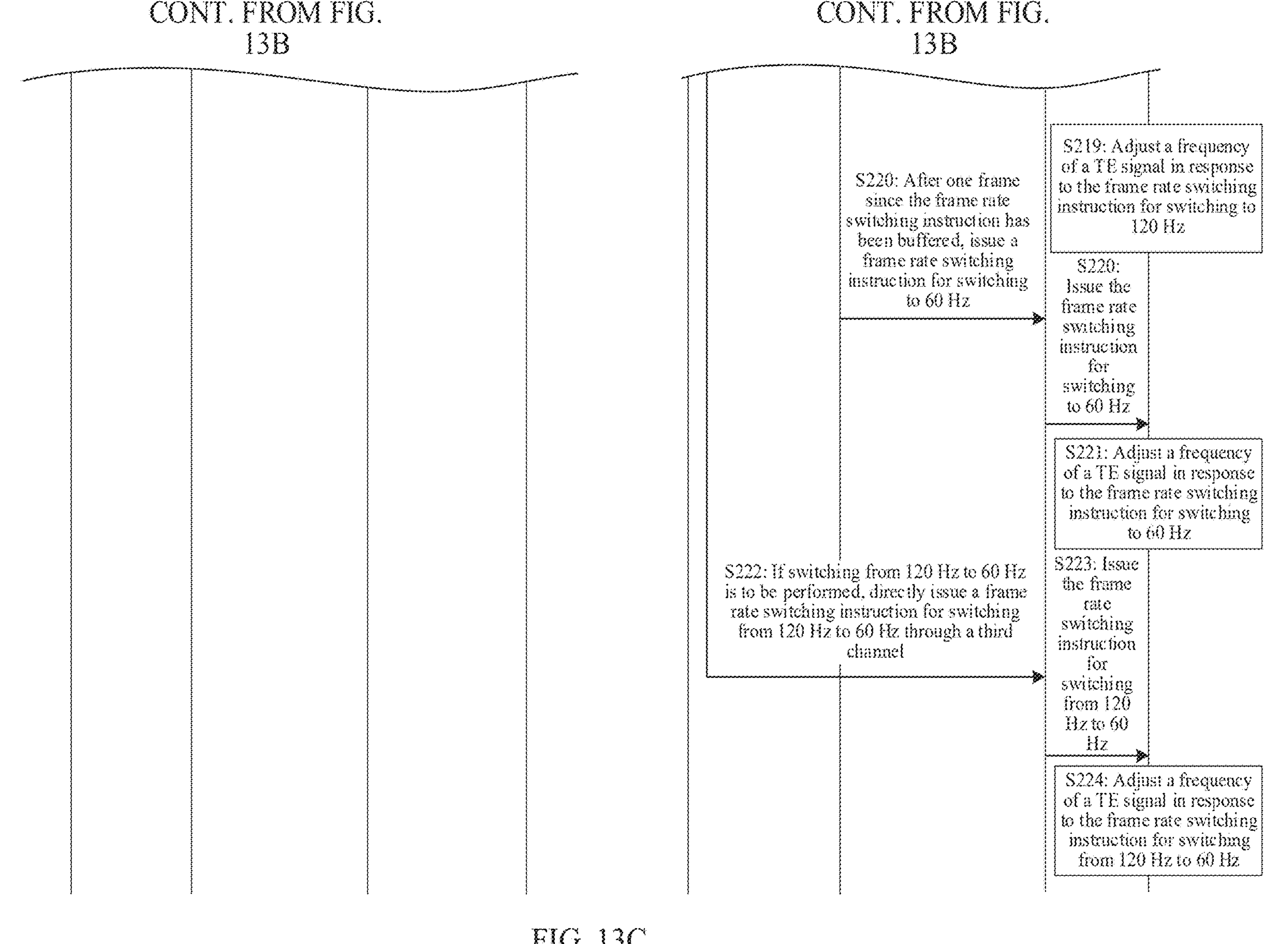

FIG. 13A to FIG. 13C are a flowchart of another frame rate control method according to an embodiment of this application. A difference between this method and the embodiment shown in FIG. 12A to FIG. 12C is that. The frame rate control processing flow provided in this embodiment is mainly performed by a display driver.

As shown in FIG. 13A to FIG. 13C, the method may include the following steps.

S200: The display driver obtains a preset quantity of frames and a screen type of an electronic device in an initialization stage.

S201: When detecting that a video APP is started, a frame rate management module determines a first target frame rate to enable the electronic device to run at the first target frame rate.

S202: When detecting that the reading APP is started, the frame rate management module determines a second target frame rate that matches the reading APP.

S203: when detecting that a service scenario is switched from a video scenario a reading scenario, the frame rate management module triggers SurfaceFlinger to initiate frame rate switching.

S204: SurfaceFlinger issues a frame rate switching instruction to the HWC, where the frame rate switching instruction includes the second target frame rate.

In this embodiment, the second target frame rate is a frame rate corresponding to the reading scenario.

Implementation processes of S200 to S204 in this embodiment are the same as those of S100 to S104 in FIG. 12A to FIG. 12C. Details are not described herein again.

S205: The HWC issues the frame rate switching instruction to the display driver.

In this embodiment, no modification is made to frame rate switching processing logic of the HWC and a channel between the HWC and the display driver. Upon receipt of the frame rate switching instruction, the HWC directly issues the frame rate switching instruction to the display driver through an original channel.

S206: The display driver determines whether a screen of the electronic device is an LTPS screen or an LTPO screen; and if the screen is an LTPS screen, performs S207; or if the screen is an LTPO screen, performs S216.

S207: The display driver determines whether the frame rate switching is to switch from a high frame rate to a low frame rate; and if frame rate switching is to switch from a high frame rate to a low frame rate, performs S208; or if frame rate switching is not to switch from a high frame rate to a low frame rate, performs S213.

S208: The display driver buffers the frame rate switching instruction issued by the HWC, and counts a quantity of frames of image data sent by the HWC.

S209: The display driver issues a TE frequency adjustment instruction to a DPU through a first channel, and the DPU issues the TE frequency adjustment instruction to a DDIC.

In this embodiment, the first channel (that is, channel 1 in FIG. 10) is a newly added communication channel between the display driver and the DPU. Any communication channel in this embodiment may be a software interface.

S210: The DDIC adjusts, in response to the TE frequency adjustment instruction, a frequency of a TE signal to a target frequency matching a target frame rate.

S211: Configure a MIPI signal periodicity of the DPU when a quantity of buffer frames of the frame rate switching instruction reaches the preset quantity of frames.

In this embodiment, the display driver configures the MIPI signal periodicity of the DPU through a second channel between the display driver and the DPU. The second channel (that is, channel 2 in FIG. 10) is the original channel between the display driver and the DPU, and the channel is configured to send the configured MIPI signal periodicity of the DPU.

S212: A modified MIPI signal and a modified TE frequency take effect synchronously.

Implementation processes of S206 to S212 in this embodiment are the same as those of S105 to S112 shown in FIG. 12A to FIG. 12C, except that S206 to S209 and S211 are performed by the display driver instead of the HWC.

S213: The display driver modifies the MIPI signal periodicity in response to the frame rate switching instruction, and issues the frame rate switching instruction to the DPU.

In this embodiment, the display driver may issue the frame rate switching instruction to the DPU through a third channel (that is, channel 3 in FIG. 10).

The third channel may be an original channel between the display driver and the DPU, and the channel is configured to transmit the frame rate switching instruction.

S214: The DPU issues the frame rate switching instruction to the DDIC.

S215: The DDIC adjusts, in response to the frame rate switching instruction, the frequency of the TE signal to complete the frame rate switching.

Implementation processes of S213 to S215 in this embodiment are the same as those of S113 to S116 in FIG. 12A to FIG. 12C. Details are not described herein again.

S216: The display driver determines whether the current frame rate switching is to switch from 90 Hz to 60 Hz; and if the current frame rate switching is to switch from 90 Hz to 60 Hz, performs S217; or if the current frame rate switching is not to switch from 90 Hz to 60 Hz, performs S222.

If the current screen is an LTPO screen, the display driver continues to determine whether the frame rate switching is to switch from 90 Hz to 60 Hz (or 40 Hz, 30 Hz, or 20 Hz).

S217: The display driver buffers an original frame rate switching instruction, and counts a quantity of frames of received image data.

S218: The display driver issues to a DPU a first frame rate switching instruction for switching to 120 Hz, and the DPU issues the first frame rate switching instruction to a DDIC.

In this embodiment, the display driver may issue the frame rate switching instruction for switching to 120 Hz to the DPU through a first channel, and the first channel is channel 1 between the display driver and the DPU shown in FIG. 11.

S219: The DDIC adjusts the frequency of the TE signal in response to the first frame rate switching instruction.

S220: After one frame since the frame rate switching instruction has been buffered, the display driver issues to the DPU a second frame rate switching instruction for switching to 60 Hz, and the DPU issues the second frame rate switching instruction to the DDIC.

In this embodiment, the display driver issues the frame rate switching instruction for switching to 60 Hz to the DPU through channel 3 between the display driver and the DPU shown in FIG. 11.

S221: The DDIC adjusts the frequency of the TE signal in response to the second frame rate switching instruction.

S222: The display driver issues the frame rate switching instruction to a DPU.

In this embodiment, the display driver may issue the frame rate switching instruction to the DPU through channel 3 between the display driver and the DPU shown in FIG. 11.

S223: The DPU issues the frame rate switching instruction to the DDIC.

S224: The DDIC adjusts the frequency of the TE signal to the target frame rate in response to the frame rate switching instruction.

Implementation processes of S216 to S224 in this embodiment are the same as those of S117 to S124 shown in FIG. 12A to FIG. 12C, except that S216 and S217 are performed by the display driver instead of the HWC. Details are not described herein again.

According to the frame rate control method provided in this embodiment, upon receipt of the frame rate switching instruction, the display driver first determines the screen type of the electronic device; if the screen type is an LTPS screen, further determines whether the frame rate switching is to switch from a high frame rate to a low frame rate; and if the frame rate switching is to switch from a high frame rate to a low frame rate, buffers the received frame rate switching instruction and counts the quantity of frames of the received image data sent by the HWC. The display driver performs the frame rate switching in two steps, first issuing the TE frequency adjustment instruction to adjust the frequency of the TE signal in a timely manner; and when the count value reaches the preset quantity of frames, issuing the MIPI signal adjustment instruction to adjust the MIPI signal periodicity. In this way, it can be ensured that the TE frequency and the MIPI signal take effect in a same periodicity, so that display anomalies caused by the TE frequency and the MIPI signal not taking effect synchronously during frame rate switching are avoided.

If the screen type is an LTPO screen, it is determined whether the frame rate switching is to switch from 90 Hz to 60 Hz. If the frame rate switching is to switch from 90 Hz to 60 Hz, the frame rate switching instruction is also performed in two steps: first, issuing the frame rate switching instruction for switching to 120 Hz, and after one frame, issuing the frame rate switching instruction for switching to 60 Hz. The frame rate switching instruction for switching to 120 Hz is first issued to cause a frame rate of the next frame to remain at 90 Hz, so as to avoid a frame loss caused by directly switching the frame rate from 90 Hz to 60 Hz The frame rate switching instruction for switching to 60 Hz is issued after one frame to enable the frame rate to be successfully switched to 60 Hz.

Based on the foregoing descriptions of the implementations, a person skilled in the art may clearly understand that for convenience and ease of description, division of the foregoing function modules is merely used as an example for illustration. In actual application, the foregoing functions can be allocated to and implemented by different function modules based on needs. To be specific, an inner structure of an apparatus is divided into different function modules to implement all or some of the functions described above. For a specific working process of the system, apparatus, and unit described above, refer to a corresponding process in the foregoing method embodiments. Details are not described herein again.

In the embodiments provided in this application, it should be understood that the disclosed system, apparatus, and method may be implemented in other manners. For example, the apparatus embodiments described above are merely examples. For example, division into the modules or units is merely a logical function division and there may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate components may or may not be physically separated, and the components displayed as units may or may not be physical units, that is, may be located in one place or may be distributed over a plurality of network units. Some or all of the units may be selected based on actual needs to achieve the objectives of the solutions of the embodiments.

In addition, functional units in embodiments of this application may be integrated into one processing unit, or each of the units may exist alone physically, or two or more units may be integrated into one unit. The integrated unit may be implemented in the form of hardware, or may be implemented in the form of a software functional unit.

When the integrated unit is implemented in the form of a software functional unit and sold or used as an independent product, the integrated unit may be stored in a computer-readable storage medium. Based on such an understanding, the technical solutions of embodiments essentially, or the part contributing to the conventional technologies, or all or some of the technical solutions may be implemented in the form of a software product. The computer software product is stored in a storage medium and includes a plurality of instructions for instructing a computer device (which may be a personal computer, a server, a network device, or the like) or a processor to perform all or some of the steps of the methods described in the embodiments. The foregoing storage medium includes: any medium that can store program code, such as a flash memory, a removable hard disk, a read-only memory, a random access memory, a magnetic disk, or an optical disc.

The foregoing descriptions are merely specific implementations of this application, and are not intended to limit the protection scope of this application. Any variation or replacement within the technical scope disclosed in this application shall fall within the protection scope of this application. Therefore, the protection scope of this application shall be subject to the protection scope of the claims.

The invention claimed is:

1. A frame rate control method, applied to an electronic device using a Low Temperature Poly-silicon (LTPS) screen, and comprising:

receiving a first operation of a user;

starting a first application in response to the first operation;

during running of the first application, transmitting an image frame based on a first Mobile Industry Processor Interface (MIPI) signal and sending the image frame for display based on a first TE signal, wherein a frequency of a first Tearing Effect (TE) signal is the same as a first frame rate;

receiving a second operation of the user;

starting a second application in response to the second operation and generating a frame rate switching instruction;

buffering the frame rate switching instruction;

generating a second TE signal based on the first TE signal;

generating a second MIPI signal based on the first MIPI signal when a quantity of image frames received by a hardware composer of the electronic device reaches a first quantity since the frame rate switching instruction has been buffered; and transmitting the image frame based on the second MIPI signal, and sending the image frame for display based on the second TE signal, wherein a frequency of the second TE signal is the same as a second frame rate, and the second frame rate is different from the first frame rate.

2. The method according to claim 1, wherein before the generating a second MIPI signal based on the first MIPI signal when a quantity of image frames received by a hardware composer of the electronic device reaches a first quantity since the frame rate switching instruction has been buffered, the method further comprises:

after the frame rate switching instruction is buffered, counting the quantity of image frames received by the hardware composer of the electronic device; and when a count value reaches the first quantity, determining that the quantity of image frames received by the hardware composer of the electronic device reaches the first quantity since the frame rate switching instruction has been buffered.

3. The method according to claim 1, wherein before the receiving a second operation of the user, the method further comprises:

receiving a third operation of the user; and closing the first application or returning to a home screen in response to the third operation.

4. The method according to claim 1, wherein the first application is a video application, and the second application is an application that displays an image and text.

5. The method according to claim 1, wherein before the buffering the frame rate switching instruction, the method further comprises: determining that the first frame rate is higher than the second frame rate.

6. The method according to claim 1, wherein the generating a second MIPI signal based on the first MIPI signal when a quantity of image frames received by a hardware composer of the electronic device reaches a first quantity since the frame rate switching instruction has been buffered comprises:

when the quantity of image frames received by the hardware composer reaches the first quantity since the frame rate switching instruction has been buffered, parsing the frame rate switching instruction to obtain the second frame rate;

obtaining, based on mapping relationships between frame rates and periodicities of MIPI signals, a first periodicity matching the second frame rate; and generating, based on the first periodicity, the second MIPI signal using the first MIPI signal, wherein a periodicity of the second MIPI signal is equal to the first periodicity, and the first periodicity is longer than a periodicity of the first MIPI signal.

7. The method according to claim 1, wherein the generating a second TE signal based on the first TE signal comprises:

parsing the frame rate switching instruction to obtain the second frame rate; and generating a TE frequency adjustment instruction based on the second frame rate, and generating the second TE signal based on the first TE signal in response to the TE frequency adjustment instruction.

8. A frame rate control method, applied to an electronic device using a Low Temperature Poly-silicon (LTPS) screen, and comprising:

receiving a first operation of a user;

starting a first application in response to the first operation;

during running of the first application, transmitting an image frame based on a first Mobile Industry Processor Interface (MIPI) signal and sending the image frame for display based on a first TE signal, wherein a frequency of a first Tearing Effect (TE) signal is the same as a first frame rate;

receiving a second operation of the user;

starting a second application in response to the second operation;

generating a second TE signal based on the first TE signal in a first periodicity;

generating a second MIPI signal based on the first MIPI signal in a second periodicity, wherein the second periodicity follows the first periodicity, with a preset quantity of first periodicity intervals in between, and a value of the first periodicity interval is a reciprocal of the first frame rate; and in a third periodicity, transmitting the image frame based on the second MIPI signal, and sending the image frame for display based on the second TE signal, wherein the third periodicity follows the second periodicity, a frequency of the second TE signal is the same as a second frame rate, and the second frame rate is different from the first frame rate.

9. An electronic device, wherein the electronic device comprises: one or more processors, a memory, and a touch screen, wherein the memory is configured to store program code; and the one or more processors are configured to run the program code to enable the electronic device to:

receive a first operation of a user;

start a first application in response to the first operation;

during running of the first application, transmit an image frame based on a first Mobile Industry Processor Interface (MIPI) signal and sending the image frame for display based on a first TE signal, wherein a frequency of a first Tearing Effect (TE) signal is the same as a first frame rate;

receive a second operation of the user;

start a second application in response to the second operation and generating a frame rate switching instruction;

buffer the frame rate switching instruction;

generate a second TE signal based on the first TE signal;

generating a second MIPI signal based on the first MIPI signal when a quantity of image frames received by a hardware composer of the electronic device reaches a first quantity since the frame rate switching instruction has been buffered; and transmit the image frame based on the second MIPI signal, and sending the image frame for display based on the second TE signal, wherein a frequency of the second TE signal is the same as a second frame rate, and the second frame rate is different from the first frame rate.

* * * * *